US010216999B2

(12) United States Patent
Kozuma et al.

(10) Patent No.: US 10,216,999 B2
(45) Date of Patent: Feb. 26, 2019

(54) DISPLAY SYSTEM, ELECTRONIC DEVICE, AND DISPLAY METHOD

(71) Applicant: Semiconductor Energy Laboratory Co., Ltd., Kanagawa-ken (JP)

(72) Inventors: Munehiro Kozuma, Kanagawa (JP); Yoshiyuki Kurokawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 15/703,119

(22) Filed: Sep. 13, 2017

(65) Prior Publication Data

US 2018/0082118 A1 Mar. 22, 2018

(30) Foreign Application Priority Data

Sep. 16, 2016 (JP) .................................. 2016-181419

(51) Int. Cl.
*G06T 11/60* (2006.01)
*G06K 9/00* (2006.01)
(Continued)

(52) U.S. Cl.
CPC ....... *G06K 9/00671* (2013.01); *G06F 3/0304* (2013.01); *G06F 3/0308* (2013.01);
(Continued)

(58) Field of Classification Search
None
See application file for complete search history.

(56) References Cited

U.S. PATENT DOCUMENTS 6,714,268 B2   3/2004   Wang et al.
7,038,641 B2   5/2006   Hirota et al.
(Continued)

FOREIGN PATENT DOCUMENTS

JP   2001-066593 A   3/2001
JP   2002-196702 A   7/2002
(Continued)

OTHER PUBLICATIONS

Lee, J-H. et al., "High Ambient-Contrast-Ratio Display Using Tandem Reflective Liquid Crystal Display and Organic Light-Emitting Device," Optics Express, Nov. 14, 2005, vol. 13, No. 23, pp. 9431-9438.
(Continued)

*Primary Examiner* — Motilewa Good Johnson
(74) *Attorney, Agent, or Firm* — Husch Blackwell LLP

(57) ABSTRACT

A display system is provided. The display system includes an imaging device, a processing device, and a display device that includes first and second display elements. The imaging device has a function of supplying imaging data based on a captured image. The processing device has a function of receiving the imaging data, supplying first image data containing at least part of the captured image, performing determination processing for determining whether the captured image contains a predetermined object, performing image processing based on the result of the determination processing, and supplying second image data based on the image processing. The display device has a function of receiving the first and second image data. The first display element has a function of displaying an image based on the first image data, and the second display element has a function of displaying an image based on the second image data.

10 Claims, 13 Drawing Sheets

(51) Int. Cl.
  *G06F 3/03*      (2006.01)
  *G06K 9/22*      (2006.01)
  *G06K 9/32*      (2006.01)
  *G06K 9/36*      (2006.01)
  *G06T 19/00*     (2011.01)
  *H04N 5/232*     (2006.01)
  *G06F 3/0481*    (2013.01)

(52) U.S. Cl.
  CPC ........... *G06F 3/04815* (2013.01); *G06K 9/22* (2013.01); *G06K 9/3241* (2013.01); *G06K 9/36* (2013.01); *G06T 19/006* (2013.01); *H04N 5/23222* (2013.01)

(56) References Cited

U.S. PATENT DOCUMENTS

| | | |
|---|---|---|
| 7,084,936 B2 | 8/2006 | Kato |
| 7,102,704 B2 | 9/2006 | Mitsui et al. |
| 7,176,991 B2 | 2/2007 | Mitsui et al. |
| 7,227,526 B2 * | 6/2007 | Hildreth ............. G06F 3/011 345/156 |
| 7,239,361 B2 | 7/2007 | Kato |
| 7,248,235 B2 | 7/2007 | Fujii et al. |
| 7,385,654 B2 | 6/2008 | Mitsui et al. |
| 8,384,770 B2 | 2/2013 | Konno et al. |
| 8,512,152 B2 | 8/2013 | Ehara et al. |
| 8,633,947 B2 | 1/2014 | Kitahara |
| 8,780,183 B2 | 7/2014 | Ito |
| 8,854,356 B2 | 10/2014 | Oyagi et al. |
| 8,882,591 B2 | 11/2014 | Kawamoto et al. |
| 9,278,281 B2 | 3/2016 | Ito et al. |
| 9,282,319 B2 | 3/2016 | Konno et al. |
| 2003/0201960 A1 | 10/2003 | Fujieda |
| 2006/0072047 A1 | 4/2006 | Sekiguchi |
| 2008/0180618 A1 | 7/2008 | Fujieda |
| 2010/0171905 A1 | 7/2010 | Huang et al. |
| 2011/0249862 A1 * | 10/2011 | Tokikura ............. G06T 7/20 382/103 |
| 2011/0304702 A1 | 12/2011 | Ito |
| 2011/0304703 A1 | 12/2011 | Ito |
| 2013/0335303 A1 * | 12/2013 | MacIocci ............. G06F 3/011 345/8 |
| 2014/0237366 A1 * | 8/2014 | Poulos ................ G06F 3/013 715/728 |
| 2014/0375683 A1 * | 12/2014 | Salter ................. G06F 3/013 345/633 |
| 2015/0065244 A1 | 3/2015 | Kawamoto et al. |
| 2016/0283028 A1 | 9/2016 | Yamazaki et al. |
| 2016/0299387 A1 | 10/2016 | Yamazaki et al. |
| 2016/0327798 A1 * | 11/2016 | Xiao .................. G02B 3/0006 |
| 2016/0358986 A1 | 12/2016 | Yamazaki et al. |
| 2017/0031192 A1 | 2/2017 | Yamazaki et al. |
| 2017/0031471 A1 | 2/2017 | Yamazaki et al. |
| 2017/0033172 A1 | 2/2017 | Yamazaki et al. |
| 2017/0038641 A1 | 2/2017 | Yamazaki |
| 2017/0270715 A1 * | 9/2017 | Lindsay .............. G06F 3/011 |
| 2018/0040640 A1 | 2/2018 | Takahashi et al. |
| 2018/0059721 A1 | 3/2018 | Akimoto |

FOREIGN PATENT DOCUMENTS

| | | |
|---|---|---|
| JP | 2004-296162 A | 10/2004 |
| JP | 2007-232882 A | 9/2007 |
| JP | 2011-076589 A | 4/2011 |
| JP | 2012-094100 A | 5/2012 |
| JP | 2013-120319 A | 6/2013 |
| JP | 2013-221965 A | 10/2013 |
| JP | 2018-031944 A | 3/2018 |

OTHER PUBLICATIONS

Shieh, H-P.D, "Transflective Display by Hybrid OLED and LCD," LEOS 2005 (IEEE Lasers and Electro-Optics Society Annual Meeting), Oct. 22, 2005, pp. 650-651, IEEE.

* cited by examiner

DISPLAY SYSTEM, ELECTRONIC DEVICE, AND DISPLAY METHOD

BACKGROUND OF THE INVENTION

1. Field of the Invention

One embodiment of the present invention relates to a display system or an electronic device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

An image display system that recognizes a predetermined object contained in a captured image and displays a combination of an object in a virtual space and the captured image is proposed (see Patent Document 1). Patent Document 1 discloses an image display system that detects a marker or the like, which is provided in advance, from a captured image and displays a combination of an object in a virtual space and the captured image.

REFERENCE

[Patent Document 1] Japanese Published Patent Application No. 2012-094100

SUMMARY OF THE INVENTION

In a moving image display system that recognizes a predetermined object contained in a captured moving image and displays a combination of an image of an object in a virtual space (hereinafter also referred to as a virtual object) and the captured moving image, sometimes the detection of the predetermined object is difficult and the virtual object cannot be stably displayed.

When an imaging device to capture a moving image is roughly shaken and a state in which the predetermined object can be detected and a state in which the predetermined object cannot be detected are rapidly and alternately switched, for example, a state in which a virtual object is displayed on a display device and a state in which the virtual object is not displayed on the display device are also rapidly and alternately switched sometimes. In such a condition, a viewer of the display device recognizes the virtual object to be flickering and may feel uncomfortable.

Many electronic devices are mainly powered by batteries. The moving image display system is no exception and required to consume less power.

An object of one embodiment of the present invention is to provide a moving image display system that can stably display an image of a virtual object. Another object of one embodiment of the present invention is to provide a moving image display system that can be comfortably used.

Another object of one embodiment of the present invention is to reduce the power consumption of a moving image display system.

Note that the objects of one embodiment of the present invention are not limited to those listed above. The objects described above do not preclude the existence of other objects. The other objects are those that are not described above and will be described below. The other objects will be apparent from and can be derived from the description of the specification, the drawings, and the like by those skilled in the art. One embodiment of the present invention is to solve at least one of the above objects and the other objects.

One embodiment of the present invention is a display system including an imaging device, a processing device, and a display device. The imaging device has a function of supplying imaging data based on a captured image. The processing device has a function of receiving the imaging data, supplying first image data containing at least part of the captured image, performing determination processing for determining whether the captured image contains a predetermined object, performing image processing based on a result of the determination processing, and supplying second image data based on the image processing. The display device has a function of receiving the first image data and the second image data, and includes a first display element and a second display element. The first display element has a function of displaying an image based on the first image data, and the second display element has a function of displaying an image based on the second image data.

In the above display system, it is preferable that the processing device have a function of adding 1 to a value of a first counter in a case where the captured image is determined to contain the predetermined object, and have a function of performing the image processing in a case where the value of the first counter is greater than or equal to a predetermined number.

In the above display system, it is preferable that the processing device have a function of adding 1 to a value of a second counter in a case where the captured image is determined not to contain the predetermined object, and have a function of not performing the image processing in a case where the value of the second counter is greater than or equal to a predetermined number.

In the above display system, it is preferable that the image processing include processing of generating an image of a virtual object.

In the above display system, it is preferable that the first display element have a function of reflecting visible light.

In the above display system, it is preferable that the second display element have a function of emitting visible light.

In the above display system, it is preferable that the first display element and the second display element be provided in the same pixel unit.

In the above display system, it is preferable that the first display element and the second display element be each electrically connected to a transistor that includes a metal oxide in a semiconductor layer where a channel is formed.

In the above display system, it is preferable that the processing device include a first memory portion and a second memory portion, the first memory portion have a function of storing the first image data, and the second memory portion have a function of storing the second image data.

Another embodiment of the present invention is an electronic device that uses the above display system for displaying an image.

Another embodiment of the present invention is a display method including the steps of obtaining a captured image, determining whether the captured image contains a predetermined object, adding 1 to a value of a first counter in a case where the captured image contains the predetermined object, adding 1 to a value of a second counter in a case where the captured image does not contain the predetermined object, displaying an image of a virtual object and the captured image in a case where the captured image contains the predetermined object and the value of the first counter is greater than or equal to P (P is an integer of 2 or greater), and displaying the captured image in a case where the captured image does not contain the predetermined object and the value of the second counter is greater than or equal to N (N is an integer of 2 or greater).

In the above display method, it is preferable that the captured image be displayed with use of a first display element, and the image of the virtual object be displayed with use of a second display element.

According to one embodiment of the present invention, a moving image display system that can stably display an image of a virtual object can be provided. According to another embodiment of the present invention, a moving image display system that can be comfortably used can be provided.

According to another embodiment of the present invention, the power consumption of a moving image display system can be reduced.

Note that the effects of one embodiment of the present invention are not limited to those described above. The effects described above do not preclude the existence of other effects. The other effects are the ones that are not described above and will be described below. The other effects that are not described above will be apparent from and can be derived from the description of the specification, the drawings, and the like by those skilled in the art. One embodiment of the present invention has at least one of the above-described or the other effects. Thus, in some cases, one embodiment of the present invention does not have the effects described above.

BRIEF DESCRIPTION OF THE DRAWINGS

In the accompanying drawings:

FIG. 6A illustrates a circuit of a display device and FIGS. 6B1 and 6B2 are top views of pixels;

DETAILED DESCRIPTION OF THE INVENTION

Figure 1A:
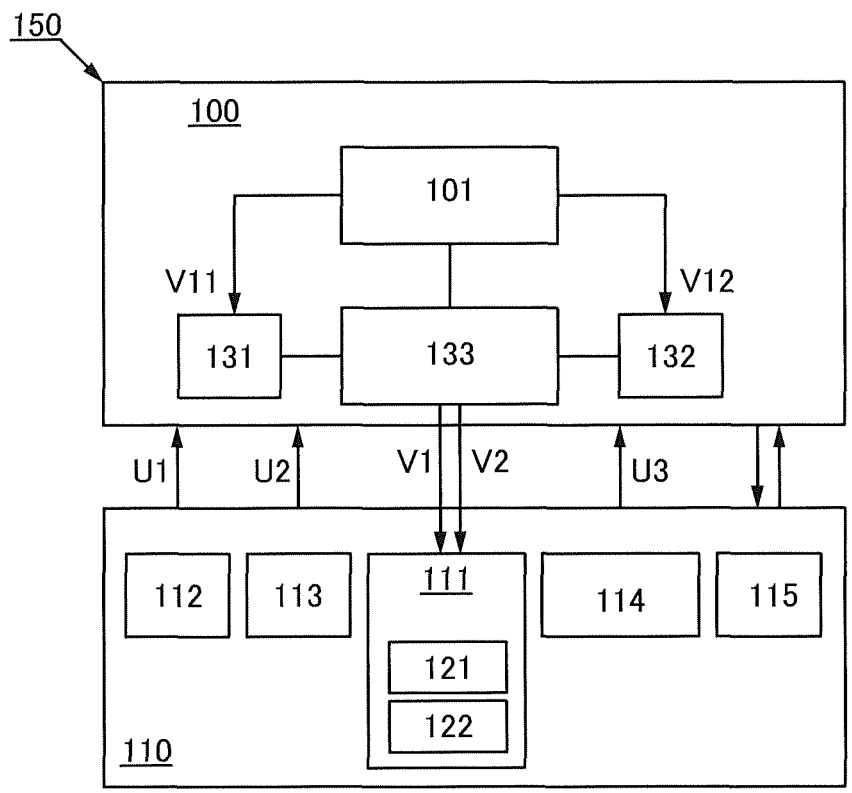
FIGS. 1A and 1B are a block diagram and a timing chart, respectively, illustrating a display system of one embodiment.

Hereinafter, embodiments will be described with reference to drawings. However, the embodiments can be implemented with various modes, and it will be readily appreciated by those skilled in the art that modes and details can be changed in various ways without departing from the spirit and scope of the present invention. Thus, the present invention should not be interpreted as being limited to the description of the embodiments below.

In the drawings, the size, the layer thickness, or the region is exaggerated for clarity in some cases. Thus, the size, the layer thickness, or the region is not limited to the illustrated scale. Note that the drawings are schematic views showing ideal examples, and embodiments of the present invention are not limited to shapes or values shown in the drawings.

Note that in this specification, ordinal numbers such as "first", "second", and "third" are used in order to avoid confusion among components, and the terms do not limit the components numerically.

In this specification, terms for describing placement, such as "over", "above", "under", and "below", are used for convenience in describing a positional relation between components with reference to drawings. Furthermore, a positional relation between components is changed as appropriate in accordance with a direction in which each component is described. Thus, without being limited by the terms used in the specification, the positional relation can be appropriately rephrased in accordance with the situation.

In this specification and the like, a transistor is an element having at least three terminals of a gate, a drain, and a source. A transistor has a channel region between a drain (a drain terminal, a drain region, or a drain electrode) and a source (a source terminal, a source region, or a source electrode), and current can flow between the source and the drain through the channel region. Note that in this specification and the like, a channel region refers to a region through which current mainly flows.

Furthermore, functions of a source and a drain might be switched when transistors having different polarities are employed or a direction of current flow is changed in circuit operation, for example. Thus, the terms "source" and "drain" can be switched in this specification and the like.

In this specification and the like, the term "parallel" indicates that the angle formed between two straight lines is greater than or equal to −10° and less than or equal to 10°. Thus, the case where the angle is greater than or equal to −5° and less than or equal to 5° is also included. The term "perpendicular" indicates that the angle formed between two straight lines is greater than or equal to 80° and less than or equal to 100°. Thus, the case where the angle is greater than or equal to 85° and less than or equal to 95° is also included.

In this specification and the like, the terms "film" and "layer" can be interchanged with each other. For example, the term "conductive layer" can be changed into the term "conductive film" in some cases. Also, the term "insulating film" can be changed into the term "insulating layer" in some cases.

Unless otherwise specified, off-state current in this specification and the like refers to drain current of a transistor in an off state (also referred to as a non-conducting state or a cutoff state). Unless otherwise specified, the off state of an n-channel transistor means that the voltage between its gate and source (Vgs: gate-source voltage) is lower than the threshold voltage Vth, and the off state of a p-channel transistor means that the gate-source voltage Vgs is higher than the threshold voltage Vth. The off-state current of an n-channel transistor sometimes refers to a drain current that flows when the gate-source voltage Vgs is lower than the threshold voltage Vth, for example.

The off-state current of a transistor depends on Vgs in some cases. Thus, "the off-state current of a transistor is I or smaller" may mean that the off-state current of the transistor is I or smaller at a certain Vgs. Furthermore, "the off-state current of a transistor" means "the off-state current in an off state at predetermined Vgs", "the off-state current in an off state at Vgs in a predetermined range", "the off-state current in an off state at Vgs with which sufficiently reduced off-state current is obtained", or the like.

As an example, the assumption is made of an n-channel transistor where the threshold voltage Vth is 0.5 V and the drain current is $1\times10^{-9}$ A at a voltage Vgs of 0.5 V, $1\times10^{-13}$ A at a voltage Vgs of 0.1 V, $1\times10^{-19}$ A at a voltage Vgs of −0.5 V, and $1\times10^{-22}$ A at a voltage Vgs of −0.8 V. The drain current of the transistor is lower than or equal to $1\times10^{-19}$ A at Vgs of −0.5 V or at Vgs in the range of −0.8 V to −0.5 V; thus, it may be said that the off-state current of the transistor is lower than or equal to $1\times10^{-19}$ A. There is Vgs at which the drain current of the transistor is $1\times10^{-22}$ A or lower; thus, it may be said that the off-state current of the transistor is $1\times10^{-22}$ A or lower.

In this specification and the like, the off-state current of a transistor with a channel width W is sometimes represented by a current value in relation to the channel width W or by a current value per given channel width (e.g., 1 μm). In the latter case, the off-state current may be expressed in the unit with the dimension of current per length (e.g., A/μm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability of a semiconductor device or the like including the transistor is ensured or a temperature at which a semiconductor device or the like including the transistor is used (e.g., a temperature of 5° C. to 35° C. inclusive). The description "off-state current of a transistor is lower than or equal to 1" might refer to a situation where there is Vgs at which the off-state current of the transistor is lower than or equal to I at room temperature, 60° C., 85° C., 95° C., 125° C., a temperature at which the reliability of a semiconductor device or the like including the transistor is ensured, or a temperature at which a semiconductor device or the like including the transistor is used (e.g., a temperature of 5° C. to 35° C. inclusive).

The off-state current of a transistor depends on voltage Vds between its drain and source in some cases. Unless otherwise specified, the off-state current in this specification may be an off-state current at Vds of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at Vds at which the reliability of a semiconductor device or the like including the transistor is ensured or Vds at which a semiconductor device or the like including the transistor is used. The description "an off-state current of a transistor is lower than or equal to 1" might refer to a situation where there is Vgs at which the off-state current of the transistor is lower than or equal to I at Vds of 0.1 V, 0.8 V, 1 V, 1.2 V, 1.8 V, 2.5 V, 3 V, 3.3 V, 10 V, 12 V, 16 V, or 20 V, Vds at which the reliability of a semiconductor device or the like including the transistor is ensured, or Vds at which in a semiconductor device or the like including the transistor is used.

In the above description of off-state current, a drain may be replaced with a source. That is, the off-state current sometimes refers to a current that flows through a source of a transistor in the off state.

In this specification and the like, the term "leakage current" sometimes expresses the same meaning as "off-state current". In this specification and the like, the off-state current sometimes refers to current that flows between a source and a drain of a transistor in the off state, for example.

Note that a voltage refers to a difference between potentials of two points, and a potential refers to electrostatic energy (electric potential energy) of a unit charge at a given point in an electrostatic field. Note that in general, a difference between a potential of one point and a reference potential (e.g., a ground potential) is merely called a potential or a voltage, and "potential" and "voltage" are used as synonymous words in many cases. Accordingly, in this specification, "potential" can be replaced with "voltage" and vice versa, unless otherwise specified.

Embodiment 1

In this embodiment, the structure of a display system of one embodiment of the present invention will be described with reference to FIGS. 1A and 1B, FIGS. 2A to 2D, and FIG. 3. In this embodiment, a data processing device 150 will be described as a structure example of a display system of one embodiment of the present invention.

Figure 1B:
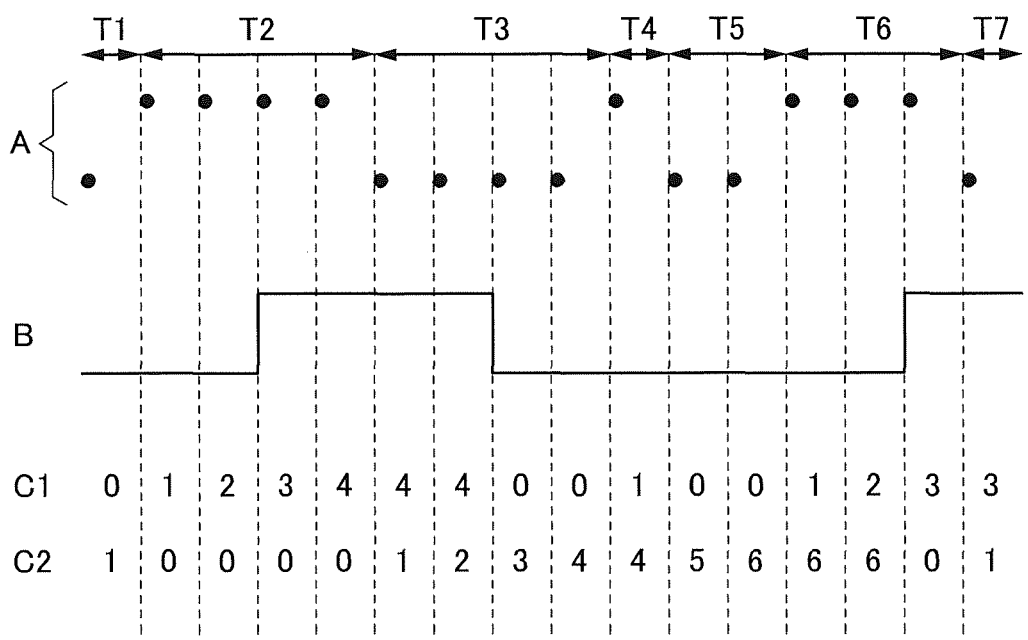

FIG. 1A is a block diagram that illustrates the data processing device 150. FIG. 1B is a timing chart that shows a display method of the display system of one embodiment of the present invention.

Figure 2A:
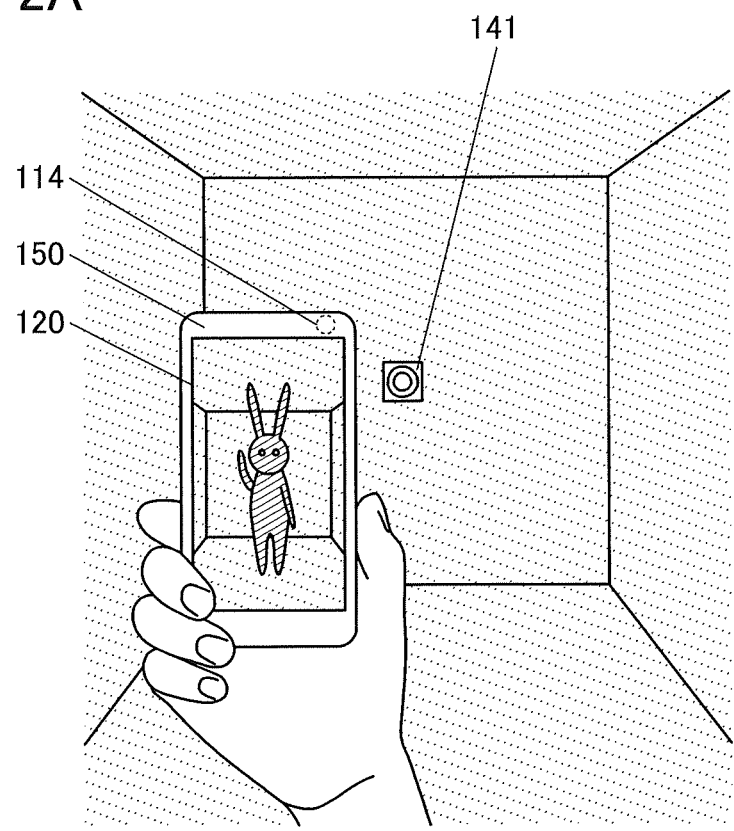
FIGS. 2A to 2D illustrate a display system of one embodiment.
Figure 2B:
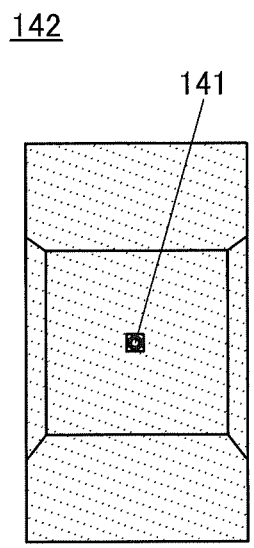
Figure 2C:
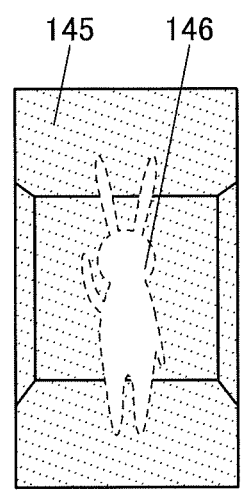
Figure 2D:
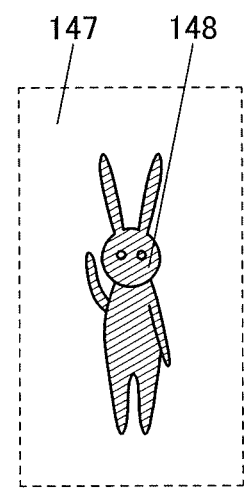

FIG. 2A is a front view that shows how the data processing device 150 is used. FIG. 2B illustrates an image captured by an imaging device included in the data processing device 150 for one frame period. FIGS. 2C and 2D each illustrate an image displayed on a display portion 120 for one frame period.

Figure 3:
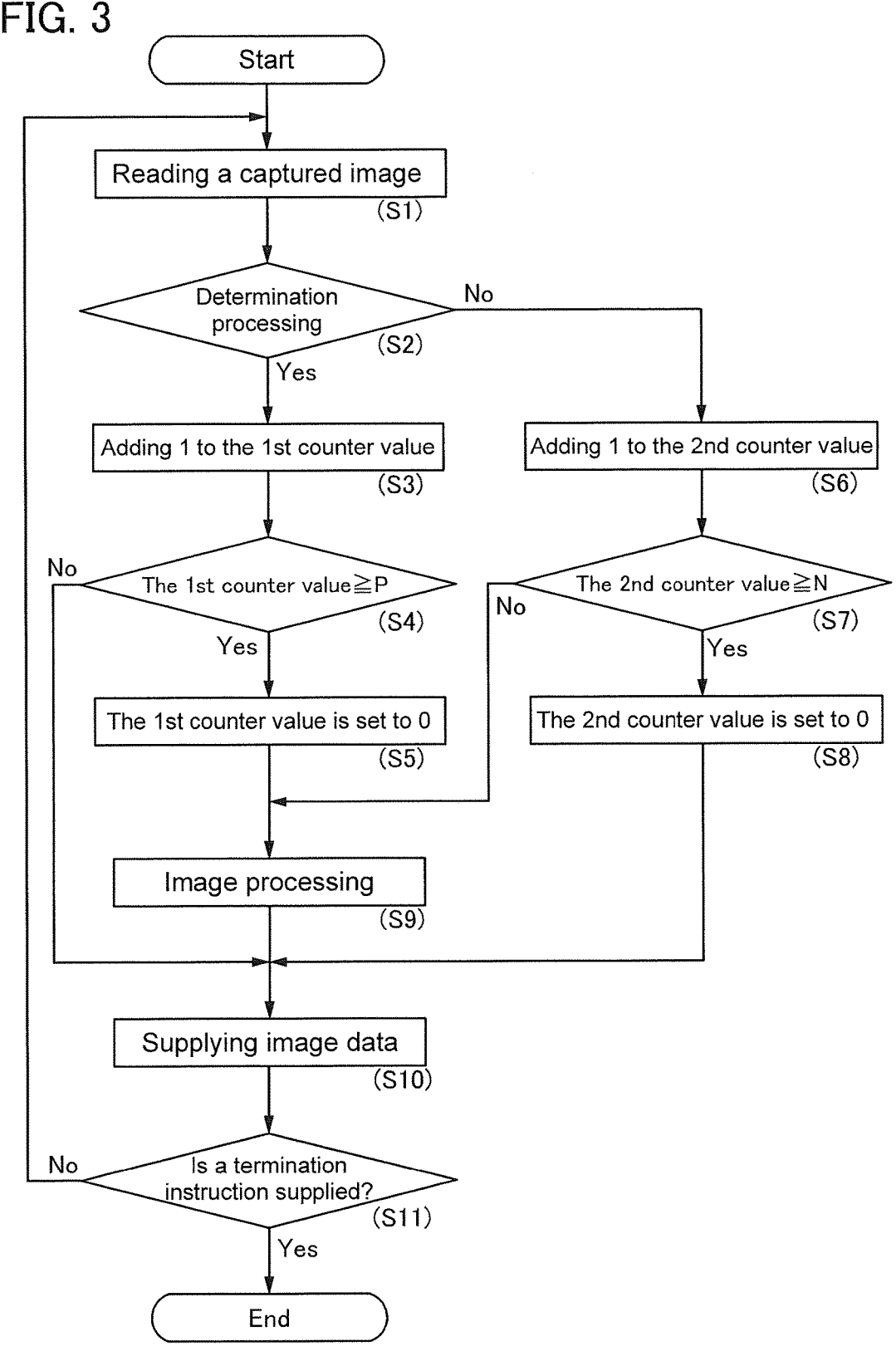
FIG. 3 is a flow chart describing a display system of one embodiment.

FIG. 3 is a flow chart that describes a display method of the display system of one embodiment of the present invention.

The data processing device 150 includes a processing device 100 and an input/output device 110 (see FIG. 1A).

The processing device 100 includes a processing circuit 101, a control circuit 133, a memory portion 131, and a memory portion 132. The processing device 100 has a function of supplying image data V1 and image data V2. The processing device 100 has a function of receiving positional data U1, sensing data U2, and imaging data U3. The processing device 100 has a function of supplying control data of the input/output device 110.

The input/output device 110 includes a display device 111, an input device 112, a sensing device 113, an imaging device 114, and a communication device 115. The input/output device 110 has a function of supplying the positional data U1, the sensing data U2, and the imaging data U3. The input/output device 110 has a function of receiving the image data V1 and the image data V2.

The processing circuit 101 has a function of performing determination processing and image processing, on the basis of the imaging data U3.

The processing circuit 101 has a function of determining whether a captured image contains a predetermined object, as the determination processing.

In this specification and the like, a captured image refers to one frame of a moving image captured by the imaging device 114. In this specification and the like, a predetermined object refers to an object, a drawing, a pattern, or the like that can be recognized by the processing circuit 101. A predetermined object can be, for example, hands and feet or a face of a human, or a marker, a character, or the like on an object.

The processing circuit 101 has a function of determining which region of a captured image is to be displayed on the display device, as first image processing. The processing circuit 101 also has a function of supplying image data V11 containing at least part of the captured image, on the basis of the result of the first image processing.

In the first image processing, a region not containing a predetermined object is determined to be the region displayed on the display device, for example. Alternatively, a region not displaying a virtual object is determined to be the region displayed on the display device. In this manner, the captured image and the virtual object can be prevented from overlapping each other in display. It is preferable to supply the image data V11 in which a region other than the region displayed on the display device is regarded as a black image.

Note that a captured moving image and a virtual object may overlap with each other in display, depending on a program or an application executed in the data processing device 150.

The processing circuit 101 has a function of generating an image of a virtual object, as second image processing. The processing circuit 101 also has a function of supplying image data V12 based on the result of the second image processing.

In the second image processing, the generation of the image of the virtual object is performed on the basis of the size of a predetermined object, the orientation of the predetermined object, the positional relation between the predetermined object and the data processing device 150, or the like which is recognized from the predetermined object contained in the captured image, for example.

The processing circuit 101 includes a first counter and a second counter, and has a function of controlling display with use of the first counter and the second counter. The detail of a method for controlling display with use of the first counter and the second counter will be described later with reference to FIG. 3.

The processing circuit 101 is electrically connected to the control circuit 133, the memory portion 131, and the memory portion 132.

The memory portion 131 has a function of storing image data based on the image data V11. The memory portion 132 has a function of storing image data based on the image data V12.

In addition, the memory portion 131 and the memory portion 132 each have a function of retaining image data as a frame memory, for example. Furthermore, the memory portion 131 and the memory portion 132 each have a function of retaining a plurality of frames and a function of comparing image data between different frames.

The memory portion 131 and the memory portion 132 are each electrically connected to the control circuit 133.

The control circuit 133 has a function of supplying the image data V1 for controlling the display device 111 on the basis of the image data V11 stored in the memory portion 131. The control circuit 133 also has a function of supplying the image data V2 for controlling the display device 111 on the basis of the image data V12 stored in the memory portion 132.

The display device 111 has a function of receiving the image data V1. The display device 111 also has a function of receiving the image data V2. In addition, the display device 111 has a function of displaying an image based on the image data V1 and the image data V2.

The input device 112 includes an input device having a function of supplying the positional data U1, which is input by a user for operating the data processing device 150. A keyboard, a hardware button, a pointing device, a touch panel, or the like can be used as the input device, for example.

The sensing device 113 includes a sensor having a function of sensing the ambient conditions and supplying the sensing data U2. A device that senses properties such as temperature, humidity, illuminance, gas, gravity, pressure, sound (vibration), acceleration, or the like can be used as the sensor, for example.

The imaging device 114 has a function of capturing a moving image and supplying the imaging data U3 based on the captured moving image. A camera for capturing a moving image can be used as the imaging device 114.

The communication device 115 has a function of supplying or acquiring information to/from a network. A GPS receiver or the like that can acquire positional data can be used as the communication device 115.

Note that these components cannot be clearly distinguished and one component may also serve as another component or include part of another component.

For example, the display device 111 on which the input device 112 is provided is the input device 112 and the display device 111 at the same time.

Next, the structure of the display device 111 will be described in detail.

The display device 111 includes a first pixel 121 and a second pixel 122.

The first pixel 121 has a function of displaying an image based on the image data V1. The first pixel 121 includes a first display element.

The second pixel 122 has a function of displaying an image based on the image data V2. The second pixel 122 includes a second display element.

In each of the first pixel 121 and the second pixel 122, a transistor including a metal oxide in a channel region (such a transistor is hereinafter referred to as an OS transistor) is preferably used as a transistor for writing image data. An OS transistor has extremely low off-state current, and can retain a potential written as image data for a long time.

A reflective liquid crystal element can be used as the first display element in the first pixel 121, for example. When an OS transistor is used as a transistor for writing image data in the pixel including a reflective liquid crystal element, the refresh rate of the liquid crystal element can be lowered. Accordingly, the refresh rate of the image data based on the image data V1 can be lowered. Furthermore, power that is consumed to display a moving image captured by the display device can be reduced. Lowering the frame rate of a moving image displayed by the first pixel further reduces power consumption, which is preferable.

Furthermore, in the case where comparison of image data between different frames at the memory portion 131 finds that there is no change in the image data, for example, the image displayed by the first pixel does not need to be updated, so that power consumption can be reduced.

A light-emitting element can be used as the second display element in the second pixel 122, for example. The second pixel including a light-emitting element has high display response speed with respect to image display with a high frame rate. Thus, display of the image data based on the image data V2 can be prevented from flickering. That is, display of a virtual object can be prevented from flickering.

Besides a light-emitting element, a transmissive liquid crystal element can be used as the second display element.

In the case where a reflective liquid crystal element and a transmissive liquid crystal element are used as the first display element and the second display element, respectively, the display device preferably includes a backlight.

With the use of an illumination sensor as the sensing device 113, the display device 111 can be used differently in accordance with the environment. Specifically, the display device 111 can be used in the following manner, for example; in a dark environment, the second pixel including a light-emitting element is mainly used for display, and in a bright environment, the first pixel including a reflective liquid crystal element is mainly used for display. Using the display device 111 differently in accordance with the brightness of the environment can reduce the power consumption of the display device 111.

The detail of a display device that can be used as the display device 111 will be described in a later embodiment.

Next, a specific example of the structure of the display system of one embodiment of the present invention will be described with reference to FIGS. 2A to 2D. Here, an example in which a marker 141 is set as a predetermined object will be described.

FIG. 2A illustrates a state where a user uses the data processing device 150 in a room with a wall on which the marker 141 is painted. The data processing device 150 includes the imaging device 114 and the display portion 120.

FIG. 2B illustrates a captured image 142, which is an example of a captured image containing the marker 141. FIG. 2C illustrates an image 143, which is an example of an image generated through the processing of determining which region in the captured image 142 is displayed on the display device (i.e., the first image processing). FIG. 2D illustrates an image 144, which is an example of an image of a virtual object that is generated on the basis of data such as the size, the orientation, and the like of the marker 141.

The image 143 includes a region 145 and a region 146. The image 144 includes a region 147 and a region 148.

The region 145 corresponds to a region determined through the first image processing to be displayed, and contains the captured image. The region 146 corresponds to a region determined through the first image processing not to be displayed, and contains no image. Note that an example in which a region that does not display the virtual object is determined to be displayed is described here.

The region 147 contains no image, and the region 148 contains the image of the virtual object generated by the second image processing.

Note that the region 146 and the region 147 can each be said to be a region that displays a black image.

The image 143 is supplied to the display device 111 as the image data V1, and displayed by the first display element. The image 144 is supplied to the display device 111 as the image data V2, and displayed by the second display element. Accordingly, an image in which the image 143 and the image 144 are combined is displayed on the display portion 120 of the data processing device 150, as illustrated in FIG. 2A.

As mentioned above, for the first pixel in which the first display element is used, the refresh rate can be lowered; thus, the power consumption of the display device can be reduced. In addition, lowering the frame rate of a background image like the image 143 can further reduce the power consumption of the display device.

As mentioned above, the second pixel in which the second display element is used has high display response speed with respect to moving image display. Thus, a moving image containing the virtual object like the image 144 can be prevented from flickering.

Next, a display method of the display system of one embodiment of the present invention will be described with reference to FIG. 3. First, display of an image is started (see FIG. 3).

<<First Step>>

In a first step, a captured image is read (see S1 in FIG. 3). An object to be read in the first step may be a captured image contained in the imaging data U3 or a captured image stored in the processing device 100.

<<Second Step>>

In a second step, determination processing for determining whether the read captured image contains a predetermined object is carried out (see S2 in FIG. 3). In the case where the captured image contains the predetermined object, a third step is selected. In the case where the captured image does not contain the predetermined object, a sixth step is selected.

<<Third Step>>

In the third step, 1 is added to a value of the first counter (see S3 in FIG. 3).

<<Fourth Step>>

In a fourth step, whether the value of the first counter is less than P (P is an integer of 2 or greater) is determined (see S4 in FIG. 3). In the case where the value of the first counter is P or greater, a fifth step is selected. In the case where the value of the first counter is less than P, a tenth step is selected.

<<Fifth Step>>

In the fifth step, the second counter is reset (see S5 in FIG. 3). Note that "the second counter is reset" means that a value of the second counter is set to 0.

<<Sixth Step>>

In the sixth step, 1 is added to the value of the second counter (see S6 in FIG. 3).

<<Seventh Step>>

In a seventh step, whether the value of the second counter is less than N (N is an integer of 2 or greater) is determined (see S7 in FIG. 3). In the case where the value of the second counter is less than N, a ninth step is selected. In the case where the value of the second counter is N or greater, an eighth step is selected.

<<Eighth Step>>

In the eighth step, the first counter is reset (see S8 in FIG. 3). Note that "the first counter is reset" means that the value of the first counter is set to 0.

<<Ninth Step>>

In the ninth step, image processing is performed (see S9 in FIG. 3). Here, an example is described in which the first image processing to determine which region in the captured image is displayed on the display device and the second image processing to generate the image of the virtual object are performed as the image processing.

<<Tenth Step>>

In a tenth step, image data is supplied to the display device 111 (see S10 in FIG. 3).

In the case where the ninth step is carried out prior to the tenth step, the image data V1 based on the result of the first image processing is supplied and the image data V2 based on the result of the second image processing is supplied.

In the case where the ninth step is not carried out prior to the tenth step, the image data V1 based on the captured image is supplied.

<<Eleventh Step>>

In the case where a termination instruction is supplied in an eleventh step, display of the image is terminated. In the case where the termination instruction is not supplied in the eleventh step, the first step is selected (see S11 in FIG. 3).

Here, the display method of the display system of one embodiment of the present invention will be more specifically described with reference to a timing chart in FIG. 1B.

The timing chart in FIG. 1B shows the operation of the display system that carries out the first to eleventh steps in the flow chart in FIG. 3. Note that an example where P=3 and N=3 is shown here.

In the timing chart in FIG. 1B, "A" represents an example of the determination result in the second step (see S2 in FIG. 3). The higher value means that the captured image is determined to contain the predetermined object in the second step. The lower value means that the captured image is determined not to contain the predetermined object in the second step.

In the timing chart in FIG. 1B, "B" represents an example of the determination result in the fourth step (see S4 in FIG. 3) or the determination result in the seventh step (see S7 in FIG. 3). The higher value means that the value of the first counter is determined to be P or greater in the fourth step, or that the value of the second counter is determined to be less than N in the seventh step. The lower value means that the value of the first counter is determined to be less than P in the fourth step, or that the value of the second counter is determined to be N or greater in the seventh step.

In other words, "B" shows whether the ninth step (see S9 in FIG. 3) is carried out. The higher value means that the ninth step is carried out, and the lower value means that the ninth step is not carried out.

In the timing chart in FIG. 1B, "C1" represents the value of the first counter, and "C2" represents the value of the second counter.

A case is assumed where a state in which the captured image is determined to contain the predetermined object and a state in which the captured image is determined not to contain the predetermined object are alternately switched, as shown by "A". Specifically, a case is assumed where the captured image is determined not to contain the predetermined object in time T1, time T3, time T5, and time T7, and the captured image is determined to contain the predetermined object in time T2, time T4, and time T6.

As described in the second step (see S2 in FIG. 3) and the third step (see S3 in FIG. 3), when the captured image is determined to contain the predetermined object, 1 is added to the value of the first counter. Thus, in each of time T2, time T4, and time T6, the value of C1 increases by 1.

As described in the second step and the sixth step (see S6 in FIG. 3), when the captured image is determined not to contain the predetermined object, 1 is added to the second counter. Thus, in each of time T1, time T3, time T5, and time T7, the value of C2 increases by 1.

As described in the fourth step (see S4 in FIG. 3), when the captured image is determined to contain the predetermined object and the value of the first counter is less than P, the ninth step is not carried out. Thus, when C1 is less than 3 in time T2, time T4, and time T6, the ninth step is not carried out as shown in "B" in FIG. 1B.

As described in the fourth step, the fifth step, and the ninth step, when the captured image is determined to contain the predetermined object and the value of the first counter is P or greater, the ninth step is carried out. Thus, when C1 is 3 or greater in time T2 and time T6, the ninth step is carried out as shown in "B".

As described in the seventh step (see S7 in FIG. 3) and the ninth step, when the captured image is determined not to contain the predetermined object and the value of the second counter is less than N, the ninth step is carried out. Thus, when C2 is less than 3 in time T3 and time T7, the ninth step is carried out as shown in "B".

As described in the seventh step and the eighth step, when the captured image is determined not to contain the predetermined object and the value of the second counter is N or greater, the ninth step is not carried out. Thus, when C2 is 3 or greater in time T3 and time T5, the ninth step is not carried out as shown in "B".

Accordingly, even when the determination that the captured image does not contain the predetermined object is switched to the determination that the captured image contains the predetermined object, as long as the determination is switched again in a short time and the value of the first counter does not become P or greater, the ninth step is not carried out. In a similar manner, even when the determination that the captured image contains the predetermined object is switched to the determination that the captured image does not contain the predetermined object, as long as the determination is switched again in a short time and the value of the second counter does not become N or greater, the ninth step is carried out.

With such operation, the display system of one embodiment of the present invention is capable of stably maintaining a state of carrying out the ninth step or a state of not carrying out the ninth step, even when a state in which the captured image can be determined to contain the predetermined object and a state in which the captured image cannot be determined to contain the predetermined object are rapidly and alternately switched.

Accordingly, the display system of one embodiment of the present invention can stably maintain either a state of displaying the virtual object or a state of not displaying the virtual object. In other words, the display system of one embodiment of the present invention can stably display the virtual object. Thus, a user can comfortably use the display system of one embodiment of the present invention.

At least part of this embodiment can be implemented in combination with any of the other embodiments described in this specification as appropriate.

Embodiment 2

In this embodiment, a display device that can be used as the display device in the display system of one embodiment of the present invention, and a method for driving the display device will be described.

The display device of one embodiment of the present invention includes a pixel in which a first display element that reflects visible light is provided, or a pixel in which a second display element that emits visible light is provided.

The display device has a function of displaying an image utilizing one or both of first light reflected by the first display element and second light emitted from the second display element. Furthermore, the display device has a function of expressing gray scales by individually controlling the amount of first light reflected by the first display element and the amount of second light emitted from the second display element.

It is preferable that the display device have a structure including a first pixel expressing gray scales by controlling the amount of light reflected from the first display element and a second pixel expressing gray scales by controlling the amount of light emitted from the second display element.

The first pixels are arranged in a matrix and the second pixels are arranged in a matrix, for example, to form a display device.

The number of the first pixels is preferably the same as that of the second pixels, and the first pixels and the second pixels are preferably arranged in a display portion with the same pitch. Here, the first pixel and the second pixel adjacent to each other can be collectively referred to as a pixel unit. Accordingly, as described later, an image displayed by a plurality of first pixels, an image displayed by a plurality of second pixels, and an image displayed by both the plurality of first pixels and the plurality of second pixels can be displayed in the same display portion.

As the first display element included in the first pixel, an element that displays an image by reflecting external light can be used. Such an element does not include a light source and thus power consumption in display can be significantly reduced.

As the first display element, a reflective liquid crystal element can be typically used. As the first display element, other than a Micro Electro Mechanical Systems (MEMS) shutter element and an optical interference type MEMS element, an element using a microcapsule method, an electrophoretic method, an electrowetting method, an Electronic Liquid Powder (registered trademark) method, or the like can be used.

As the second display element included in the second pixel, an element including a light source and displaying an image using light from the light source can be used. Specifically, it is preferable to use an electroluminescence element in which light can be extracted from a light-emitting substance by application of an electric field. Since the luminance and the chromaticity of light emitted from such a pixel are not affected by external light, an image with high color reproducibility (a wide color gamut) and a high contrast, i.e., a clear image can be displayed.

As the second display element, a self-luminous light-emitting element such as an organic light-emitting diode (OLED), a light-emitting diode (LED), a quantum-dot light-emitting diode (QLED), and a semiconductor laser can be used. Alternatively, a combination of a backlight that serves as a light source and a transmissive liquid crystal element that controls the amount of light from the backlight transmitted therethrough may be used as the display element included in the second pixel.

The first pixel can include, for example, a subpixel exhibiting light of white (W), or subpixels exhibiting light of three colors of red (R), green (G), and blue (B). Similarly, the second pixel can include, for example, a subpixel exhibiting light of white (W), or subpixels exhibiting light of three colors of red (R), green (G), and blue (B). Note that the first pixel and the second pixel may each include subpixels of four colors or more. As the number of subpixels is increased, power consumption can be reduced and color reproducibility can be improved.

In one embodiment of the present invention, a first mode in which an image is displayed by the first pixels, a second mode in which an image is displayed by the second pixels, and a third mode in which an image is displayed by the first pixels and the second pixels can be switched. As described in Embodiment 1, the first pixel and the second pixel may each display an image based on different image data, so that a composite image can be displayed.

The first mode is a mode in which an image is displayed utilizing light reflected from the first display element. In the first mode, a light source is not necessary and thus the first mode is a driving mode with extremely low power consumption. The first mode is effective in the case where, for example, external light has a sufficiently high illuminance and is white light or light near white light. The first mode is a display mode appropriate for displaying text data, such as that of a book or that of a document. Use of reflected light enables eye-friendly display, thereby mitigating eyestrain.

The second mode is a mode in which an image is displayed utilizing light emitted from the second display element. Thus, an extremely clear image (with high contrast and high color reproducibility) can be displayed regardless of the illuminance and chromaticity of external light. The second mode is effective in the case where the illuminance of external light is extremely low, such as during the night or in a dark room, for example. When a bright image is displayed under weak external light, a user may feel that the image is too bright. To prevent this, an image with reduced luminance is preferably displayed in the second mode. Thus, not only a reduction in the luminance but also low power consumption can be achieved. The second mode is a mode suitable for displaying a clear image and a smooth moving image.

The third mode is a mode in which display is pertained using both light reflected from the first display element and light emitted from the second display element. Specifically, the display device is driven so that light emitted from the first pixel and light emitted from the second pixel adjacent to the first pixel are mixed to express one color. Accordingly, a clearer image than that in the first mode can be displayed and power consumption can be made lower than that in the second mode. For example, the third mode is effective when the illuminance of external light is relatively low such as under indoor illumination or in the morning or evening, or when the external light does not represent a white chromaticity. Furthermore, the use of light obtained by mixing reflected light and emitted light makes it possible to display an image that gives a viewer the impression of seeing a picture.

A more specific example of one embodiment of the present invention will be described below with reference to drawings.

[Structure Example of Display Device]

Figure 4:
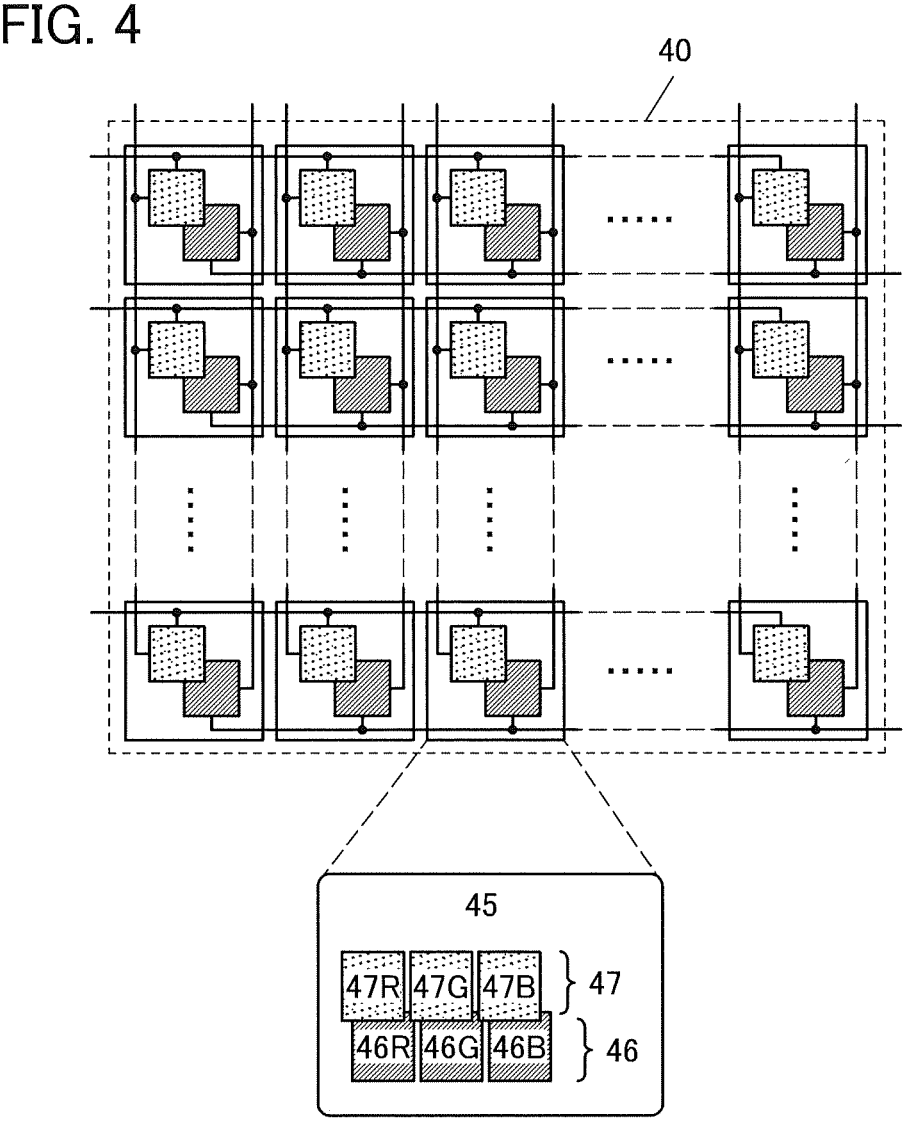
FIG. 4 illustrates a pixel unit.

FIG. 4 illustrates a pixel array 40 included in the display device of one embodiment of the present invention. The pixel array 40 includes a plurality of pixel units 45 arranged in a matrix. The pixel unit 45 includes a pixel 46 and a pixel 47.

FIG. 4 shows an example in which the pixel 46 and the pixel 47 each include display elements corresponding to three colors of red (R), green (G), and blue (B).

The pixel 46 includes a display element 46R corresponding to red (R), a display element 46G corresponding to green (G), and a display element 46B corresponding to blue (B). The display elements 46R, 46G, and 46B are each the second display element that emits visible light.

The pixel 47 includes a display element 47R corresponding to red (R), a display element 47G corresponding to green (G), and a display element 47B corresponding to blue (B). The display elements 47R, 47G, and 47B are each the first display element that reflects visible light.

That is the description of the structure example of the display device.

[Structure Example of Pixel Unit]

Figure 5A:
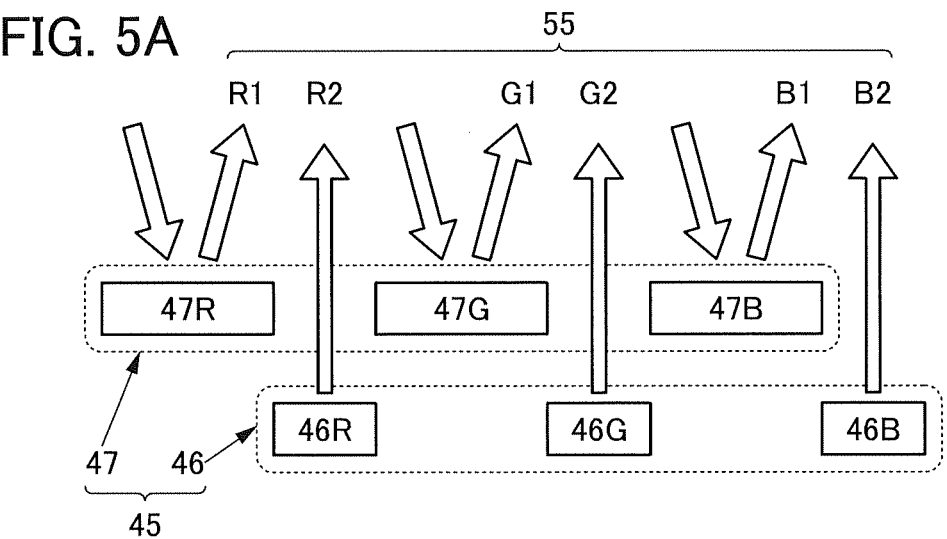
FIGS. 5A to 5C each illustrate a pixel unit.
Figure 5B:
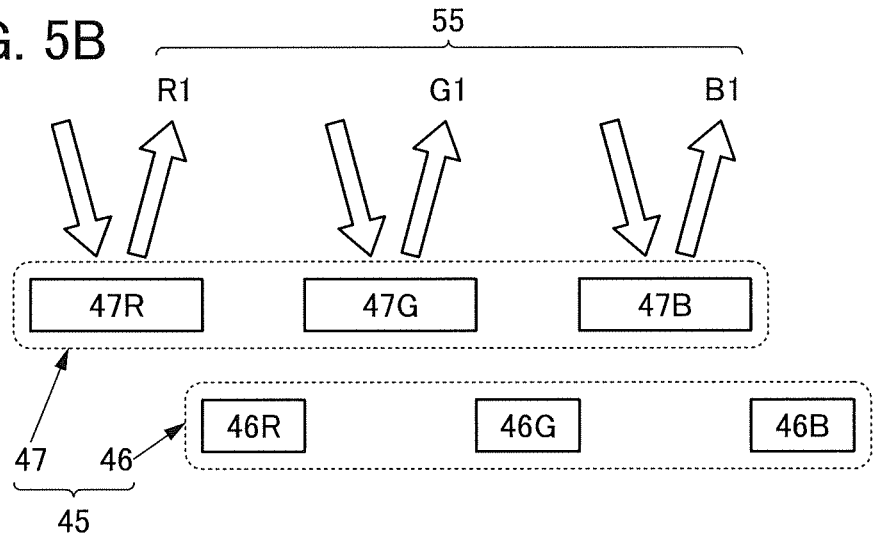
Figure 5C:
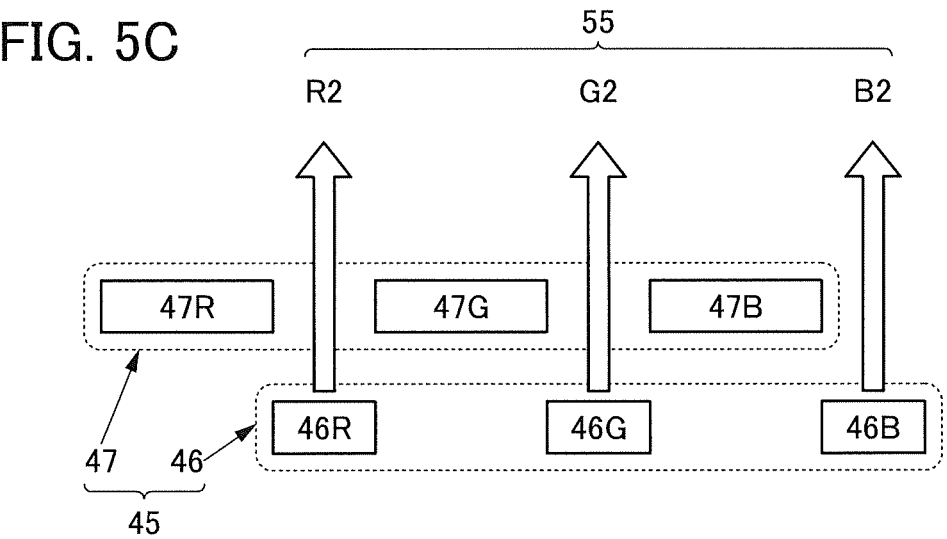

Next, the pixel unit 45 will be described with reference to FIGS. 5A to 5C. FIGS. 5A to 5C are schematic views illustrating structure examples of the pixel unit 45.

The pixel 46 includes the display element 46R, the display element 46G, and the display element 46B. The display element 46R includes a light source and emits, to the display surface side, red light R2 with a luminance corresponding to a gray level of red included in a second gray level input to the pixel 46. Similarly, the display element 46G and the display element 46B emit green light G2 and blue light B2, respectively, to the display surface side.

The pixel 47 includes the display element 47R, the display element 47G, and the display element 47B. The display element 47R reflects external light and emits, to the display surface side, red light R1 with a luminance corresponding to a gray level of red included in a first gray level input to the pixel 47. Similarly, the display element 47G and the display element 47B emit green light G1 and blue light B1, respectively, to the display surface side.

[Third Mode]

FIG. 5A shows an example of an operation mode in which an image is displayed by driving both the display elements reflecting external light (the display elements 47R, 47G, and 47B) and the display elements emitting light (the display elements 46R, 46G, and 46B). As illustrated in FIG. 5A, the pixel unit 45 can emit light 55 of a predetermined color to the display surface side by mixing light of six colors, the light R1, the light G1, the light B1, the light R2, the light G2, and the light B2.

At that time, the luminance of each of the display elements 46R, 46G, and 46B is preferably low. For example, when the maximum value of luminance of light that can be emitted by each of the display elements 46R, 46G, and 46B (which is also referred to as highest luminance) is 100%, the maximum value of luminance of light actually emitted by each of the display elements 46R, 46G, and 46B in the third mode is preferably 5% to 50% inclusive, further preferably 1% to 60% inclusive, of the highest luminance. Thus, an image can be displayed with low power consumption, the displayed image can be more picturesque, and display can be easy on eyes.

[First Mode]

FIG. 5B shows an example of an operation mode in which an image is displayed by driving the display elements 47R, 47G, and 47B that reflect external light. As illustrated in FIG. 5B, in the case where the illuminance of external light is sufficiently high, for example, the pixel unit 45 can emit the light 55 of a predetermined color to the display surface side by mixing only light from the pixel 47 (the light R1, the light G1, and the light B1) without driving the pixel 46. Thus, driving with extremely low power consumption can be performed.

[Second Mode]

FIG. 5C shows an example of an operation mode in which an image is displayed by driving the display elements 46R, 46G, and 46B. As illustrated in FIG. 5C, in the case where the illuminance of external light is extremely low, for example, the pixel unit 45 can emit the light 55 of a predetermined color to the display surface side by mixing only light from the pixel 46 (the light R2, the light G2, and the light B2) without driving the pixel 47. Accordingly, a clear image can be displayed. Furthermore, luminance is lowered when the illuminance of external light is low, which can prevent a user from feeling glare and reduce power consumption.

In this mode, the luminance of the display elements that emit visible light is preferably higher than that in the third mode. For example, the maximum value of luminance of light emitted by each of the display elements 46R, 46G, and 46B in the second mode can be 100% of the highest luminance, or 50% to 100% inclusive, preferably 60% to 100% inclusive, of the highest luminance. Accordingly, a clear image can be displayed even at a bright place with external light.

Here, each of the maximum values of luminance of light emitted by the display elements 46R, 46G, and 46B can be expressed by a dynamic range. That is, the dynamic range of each of the display elements 46R, 46G, and 46B in the third mode can be set narrower than that in the second mode. For example, the dynamic range of the display element 46R, 46G, or 46B in the third mode can be set to 5% to 50% inclusive, preferably 1% to 60% inclusive, of the dynamic range thereof in the second mode.

The above is the description of the configuration examples of the pixel unit 45.

At least part of this embodiment can be implemented in combination with any of the other embodiments described in this specification as appropriate.

Embodiment 3

An example of a display panel that can be used for the display device of one embodiment of the present invention will be described below. The display panel described below as an example includes both a reflective liquid crystal element and a light-emitting element and can display an image both in a transmissive mode and in a reflective mode.

[Structure Example]

Figure 6A:
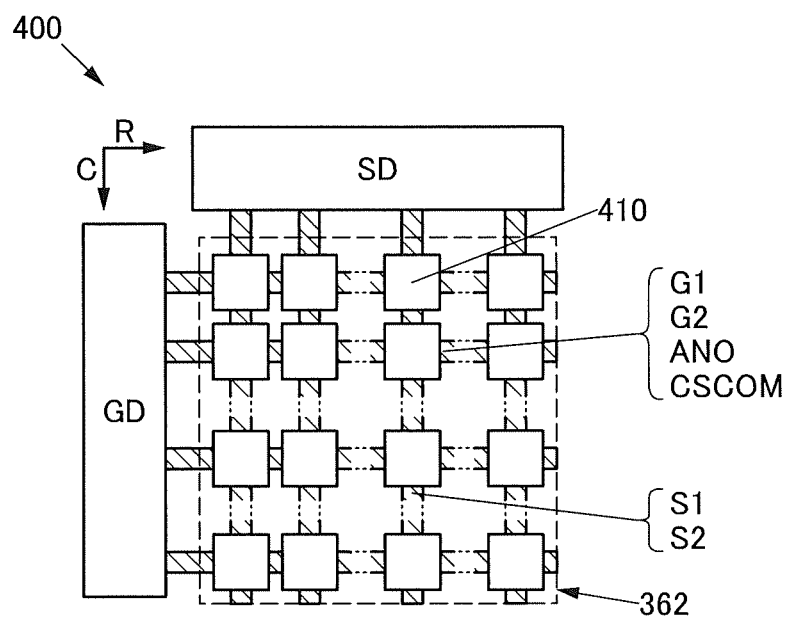
Figure 6A:
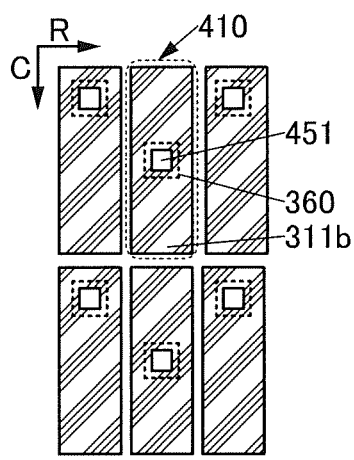
Figure 6A:
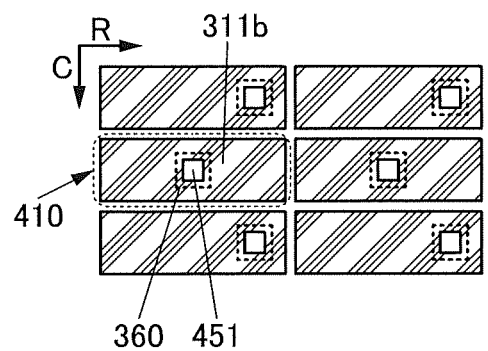

FIG. 6A is a block diagram illustrating an example of the structure of a display device 400. The display device 400 includes a plurality of pixels 410 that are arranged in a matrix in a display portion 362. The display device 400 also includes a circuit GD and a circuit SD. In addition, the display device 400 includes a plurality of wirings G1, a plurality of wirings G2, a plurality of wirings ANO, and a plurality of wirings CSCOM, which are electrically connected to the circuit GD and the pixels 410 arranged in a direction R. Moreover, the display device 400 includes a plurality of wirings S1 and a plurality of wirings S2 that are electrically connected to the circuit SD and the pixels 410 arranged in a direction C.

Although the display device includes one circuit GD and one circuit SD here for simplification, a circuit GD and a circuit SD for driving a liquid crystal element and another circuit GD and another circuit SD for driving a light-emitting element may be provided.

The pixel 410 includes a reflective liquid crystal element and a light-emitting element. In the pixel 410, the liquid crystal element and the light-emitting element overlap with each other.

FIG. 6B1 illustrates a structure example of a conductive layer 311*b* included in the pixel 410. The conductive layer 311*b* serves as a reflective electrode of the liquid crystal element in the pixel 410. The conductive layer 311*b* has an opening 451.

In FIG. 6B1, a light-emitting element 360 in a region overlapping with the conductive layer 311*b* is denoted by a dashed line. The light-emitting element 360 is placed to overlap with the opening 451 included in the conductive layer 311*b*. Thus, light from the light-emitting element 360 is emitted to a display surface side through the opening 451.

In FIG. 6B1, the pixels 410 adjacent to each other in the direction R correspond to pixels emitting different colors. As illustrated in FIG. 6B1, the openings 451 are preferably provided in different positions in the conductive layers 311*b* so as not to be aligned in the two pixels adjacent to each other in the direction R. This allows the two light-emitting elements 360 to be apart from each other, thereby preventing light emitted from the light-emitting element 360 from entering a coloring layer in the adjacent pixel 410 (such a phenomenon is also referred to as crosstalk). Furthermore, since the two adjacent light-emitting elements 360 can be placed apart from each other, a high-resolution display device is achieved even when EL layers of the light-emitting elements 360 are separately formed with a shadow mask or the like.

Alternatively, the pixels 410 may be arranged in a manner illustrated in FIG. 6B2.

If the ratio of the total area of the opening 451 to the total area except for the opening is too large, display performed using the liquid crystal element is dark. If the ratio of the total area of the opening 451 to the total area except for the opening is too small, display performed using the light-emitting element 360 is dark.

If the area of the opening 451 in the conductive layer 311b serving as a reflective electrode is too small, light emitted from the light-emitting element 360 is not efficiently extracted.

The opening 451 may have a polygonal shape, a quadrangular shape, an elliptical shape, a circular shape, a cross-like shape, a stripe shape, a slit-like shape, or a checkered pattern, for example. The opening 451 may be placed close to the adjacent pixel. Preferably, the opening 451 is placed close to another pixel emitting light of the same color, in which case crosstalk can be suppressed.

[Circuit Configuration Example]

Figure 7:
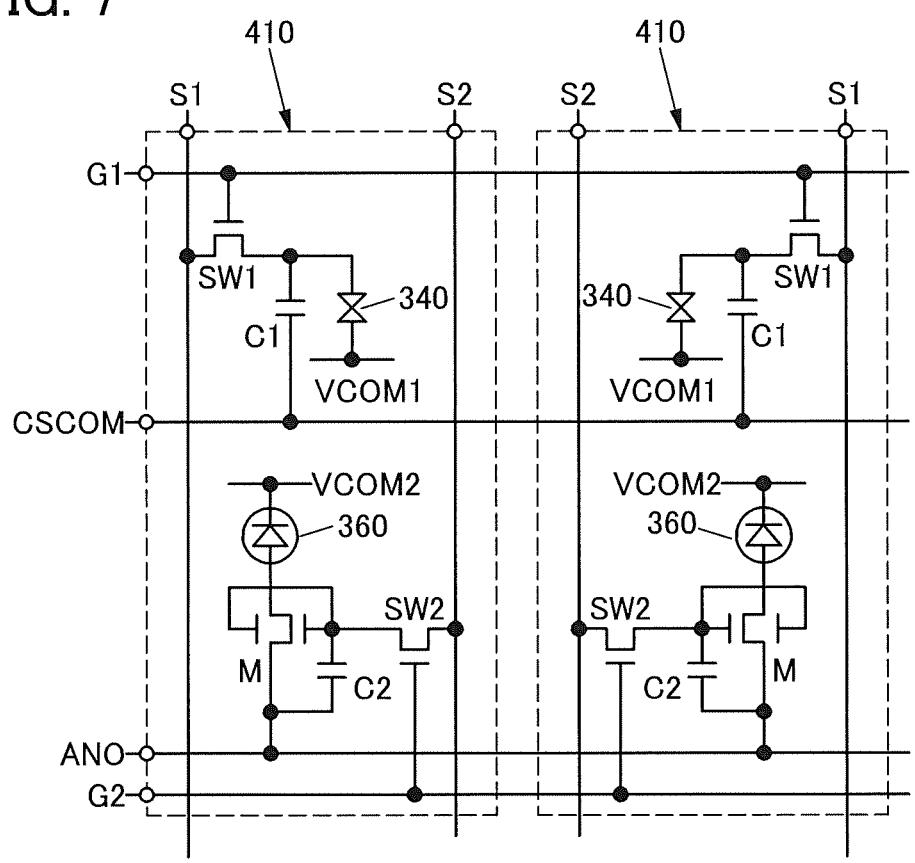
FIG. 7 illustrates a circuit of a display device.

FIG. 7 is a circuit diagram illustrating a configuration example of the pixel 410. FIG. 7 shows two adjacent pixels 410.

The pixel 410 includes a switch SW1, a capacitor C1, a liquid crystal element 340, a switch SW2, a transistor M, a capacitor C2, the light-emitting element 360, and the like. The pixel 410 is electrically connected to the wiring G1, the wiring G2, the wiring ANO, the wiring CSCOM, the wiring S1, and the wiring S2. FIG. 7 illustrates a wiring VCOM1 electrically connected to the liquid crystal element 340 and a wiring VCOM2 electrically connected to the light-emitting element 360.

FIG. 7 illustrates an example in which a transistor is used as each of the switches SW1 and SW2.

A gate of the switch SW1 is connected to the wiring G1. One of a source and a drain of the switch SW1 is connected to the wiring S1, and the other of the source and the drain is connected to one electrode of the capacitor C1 and one electrode of the liquid crystal element 340. The other electrode of the capacitor C1 is connected to the wiring CSCOM. The other electrode of the liquid crystal element 340 is connected to the wiring VCOM1.

A gate of the switch SW2 is connected to the wiring G2. One of a source and a drain of the switch SW2 is connected to the wiring S2, and the other of the source and the drain is connected to one electrode of the capacitor C2 and a gate of the transistor M. The other electrode of the capacitor C2 is connected to one of a source and a drain of the transistor M and the wiring ANO. The other of the source and the drain of the transistor M is connected to one electrode of the light-emitting element 360. The other electrode of the light-emitting element 360 is connected to the wiring VCOM2.

FIG. 7 illustrates an example in which the transistor M includes two gates between which a semiconductor is provided and which are connected to each other. This structure can increase the amount of current flowing through the transistor M.

The wiring G1 can be supplied with a signal for changing the on/off state of the switch SW1. A predetermined potential can be supplied to the wiring VCOM1. The wiring S1 can be supplied with a signal for changing the orientation of liquid crystals of the liquid crystal element 340. A predetermined potential can be supplied to the wiring CSCOM.

The wiring G2 can be supplied with a signal for changing the on/off state of the switch SW2. The wiring VCOM2 and the wiring ANO can be supplied with potentials having a difference large enough to make the light-emitting element 360 emit light. The wiring S2 can be supplied with a signal for changing the conduction state of the transistor M.

For displaying an image in the reflective mode, for example, the pixel 410 of FIG. 7 is driven with the signals supplied to the wiring G1 and the wiring S1, and the optical modulation of the liquid crystal element 340 is utilized. For displaying an image in the transmissive mode, the pixel is driven with the signals supplied to the wiring G2 and the wiring S2, and the light-emitting element 360 emits light. In the case where both modes are performed at the same time, the pixel can be driven with the signals supplied to the wiring G1, the wiring G2, the wiring S1, and the wiring S2.

Figure 8A:
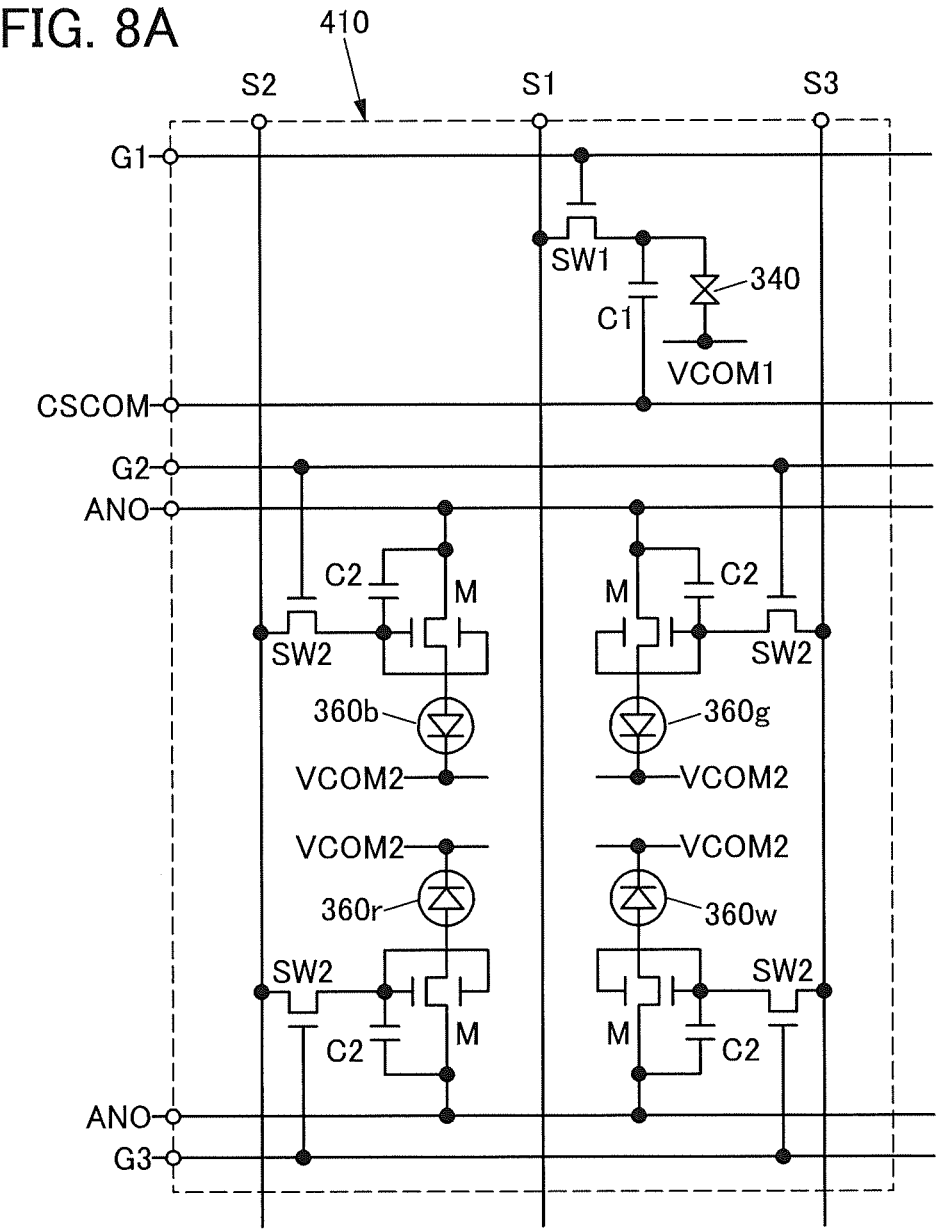
FIG. 8A illustrates a circuit of a display device and FIG. 8B is a top view of a pixel.

Although FIG. 7 illustrates an example in which one liquid crystal element 340 and one light-emitting element 360 are provided in one pixel 410, one embodiment of the present invention is not limited thereto. FIG. 8A illustrates an example in which one liquid crystal element 340 and four light-emitting elements 360 (light-emitting elements 360r, 360g, 360b, and 360w) are provided in one pixel 410.

In FIG. 8A, in addition to the wirings in the example in FIG. 7, a wiring G3 and a wiring S3 are connected to the pixel 410.

In the example in FIG. 8A, light-emitting elements emitting red light (R), green light (G), blue light (B), and white light (W) can be used for the four light-emitting elements 360, for example. As the liquid crystal element 340, a reflective liquid crystal element emitting white light can be used. Thus, for display in the reflective mode, white display with high reflectivity can be performed. For display in the transmissive mode, images can be displayed with a higher color rendering property at low power consumption.

Figure 8B:
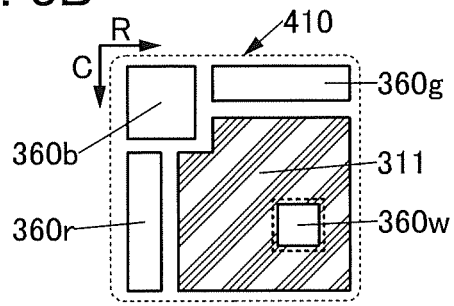

FIG. 8B illustrates a configuration example of the pixel 410. The pixel 410 includes the light-emitting element 360w overlapping with the opening of an electrode 311, and the light-emitting elements 360r, 360g, and 360b arranged in the periphery of the electrode 311. It is preferable that the light-emitting elements 360r, 360g, and 360b have almost the same light-emitting area.

[Structure Example of Display Panel]

Figure 9:
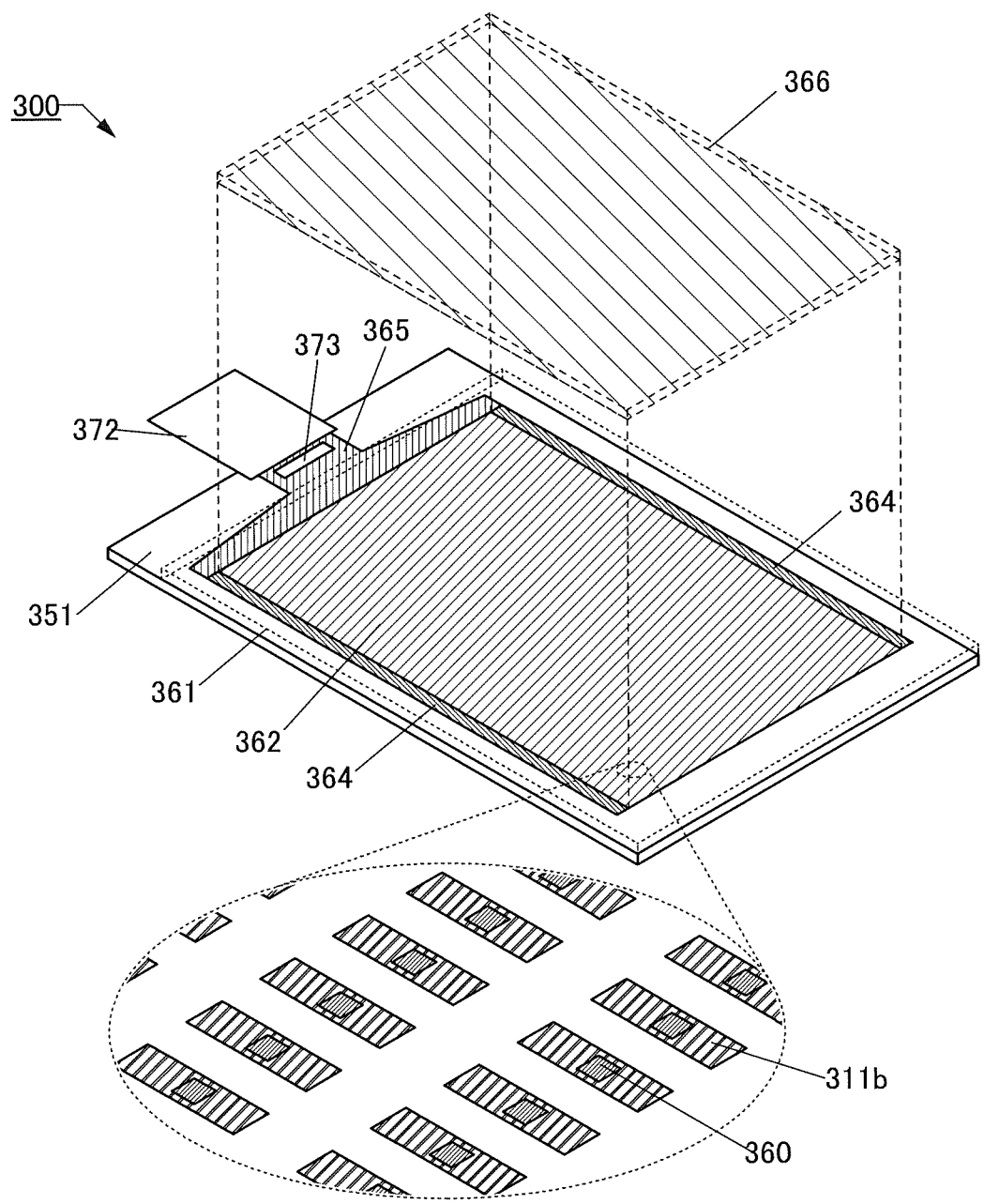
FIG. 9 illustrates a structure of a display device.

FIG. 9 is a schematic perspective view illustrating a display panel 300 of one embodiment of the present invention. In the display panel 300, a substrate 351 and a substrate 361 are attached to each other. In FIG. 9, the substrate 361 is denoted by a dashed line.

The display panel 300 includes the display portion 362, a circuit 364, a wiring 365, and the like. The substrate 351 is provided with the circuit 364, the wiring 365, the conductive layer 311b that serves as a pixel electrode, and the like. In FIG. 9, an IC 373 and an FPC 372 are mounted on the substrate 351. Thus, the structure illustrated in FIG. 9 can be referred to as a display module including the display panel 300, the FPC 372, and the IC 373.

As the circuit 364, for example, a circuit functioning as a scan line driver circuit can be used.

The wiring 365 has a function of supplying a signal or electric power to the display device or the circuit 364. The signal or electric power is input to the wiring 365 from the outside through the FPC 372 or from the IC 373.

FIG. 9 shows an example in which the IC 373 is provided on the substrate 351 by a chip on glass (COG) method or the like. As the IC 373, an IC functioning as a scan line driver circuit, a signal line driver circuit, or the like can be used. Note that the IC 373 may be omitted in the case where the display panel 300 includes circuits serving as a scan line driver circuit and a signal line driver circuit, or in the case where the circuits serving as a scan line driver circuit and a signal line driver circuit are provided outside and a signal for driving the display panel 300 is input through the FPC 372, for example. Alternatively, the IC 373 may be mounted on the FPC 372 by a chip on film (COF) method or the like.

FIG. 9 also shows an enlarged view of part of the display portion 362. The conductive layers 311b included in a plurality of display elements are arranged in a matrix in the display portion 362. The conductive layer 311b has a function of reflecting visible light and serves as a reflective electrode of the liquid crystal element 340 described later.

As illustrated in FIG. 9, the conductive layer 311b has an opening. The light-emitting element 360 is provided on the substrate 351 side of the conductive layer 311b. Light is emitted from the light-emitting element 360 to the substrate 361 side through the opening in the conductive layer 311b.

A touch sensor can be provided over the substrate 361. For example, a sheet-shaped capacitive touch sensor 366 may be provided to overlap with the display portion 362. Alternatively, a touch sensor may be provided between the substrate 361 and the substrate 351. In the case where a touch sensor is provided between the substrate 361 and the substrate 351, an optical touch sensor using a photoelectric conversion element as well as a capacitive touch sensor may be used.

[Cross-Sectional Structure Example 1]

Figure 10:
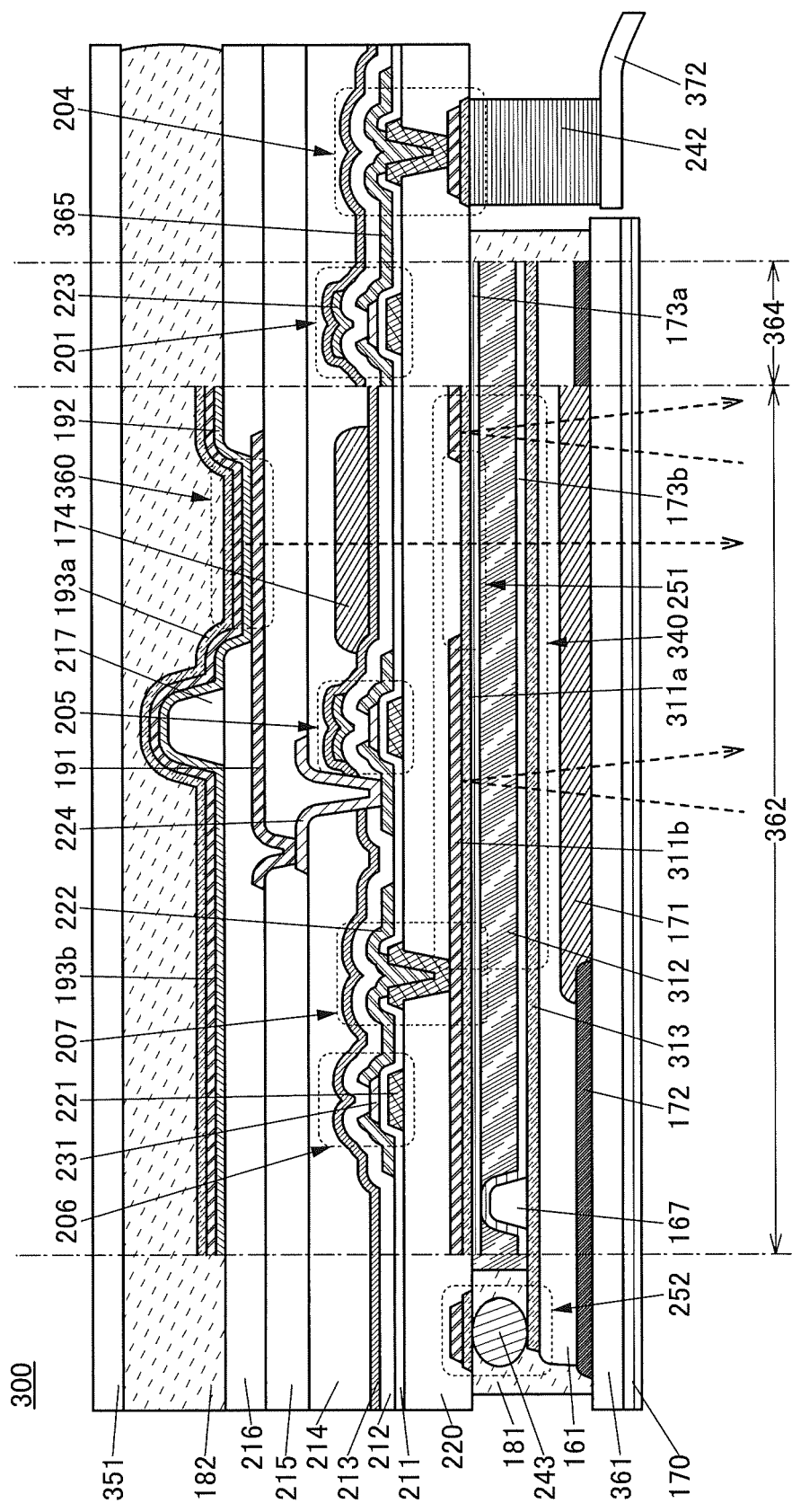
FIG. 10 illustrates a structure of a display device.

FIG. 10 shows an example of cross sections of part of a region including the FPC 372, part of a region including the circuit 364, and part of a region including the display portion 362 of the display panel illustrated in FIG. 9. Note that the touch sensor 366 is not included.

The display panel includes an insulating layer 220 between the substrates 351 and 361. The display panel also includes the light-emitting element 360, a transistor 201, a transistor 205, a transistor 206, a coloring layer 174, and the like between the substrate 351 and the insulating layer 220. Furthermore, the display panel includes the liquid crystal element 340, a coloring layer 171, and the like between the insulating layer 220 and the substrate 361. The substrate 361 and the insulating layer 220 are bonded with an adhesive layer 181. The substrate 351 and the insulating layer 220 are bonded with an adhesive layer 182.

The transistor 206 is electrically connected to the liquid crystal element 340. The transistor 205 is electrically connected to the light-emitting element 360. Since the transistors 205 and 206 are formed on a surface of the insulating layer 220 that is on the substrate 351 side, the transistors 205 and 206 can be formed through the same process.

The coloring layer 171, a light-blocking layer 172, an insulating layer 161, a conductive layer 313 serving as a common electrode of the liquid crystal element 340, an alignment film 173b, an insulating layer 167, and the like are provided over the substrate 361. The insulating layer 167 serves as a spacer for holding a cell gap of the liquid crystal element 340.

Insulating layers such as an insulating layer 211, an insulating layer 212, an insulating layer 213, an insulating layer 214, and an insulating layer 215 are provided on the substrate 351 side of the insulating layer 220. Parts of the insulating layer 211 function as gate insulating layers of the transistors. The insulating layer 212, the insulating layer 213, and the insulating layer 214 are provided to cover the transistors. The insulating layer 215 is provided to cover the insulating layer 214. The insulating layers 214 and 215 each have a function of a planarization layer. Note that an example where three insulating layers (i.e., the insulating layers 212, 213, and 214) are provided to cover the transistors and the like is described here; however, one embodiment of the present invention is not limited to this example, and four or more insulating layers, a single insulating layer, or two insulating layers may be provided. The insulating layer 214 serving as a planarization layer is not necessarily provided.

The transistors 201, 205, and 206 each include a conductive layer 221 part of which functions as a gate, conductive layers 222 part of which functions as a source or a drain, and a semiconductor layer 231. Here, multiple layers obtained by processing the same conductive film are indicated by the same hatch pattern.

The liquid crystal element 340 is a reflective liquid crystal element. The liquid crystal element 340 has a structure in which a conductive layer 311a, a liquid crystal 312, and the conductive layer 313 are stacked. The conductive layer 311b that reflects visible light is provided in contact with the substrate 351 side of the conductive layer 311a. The conductive layer 311b includes an opening 251. The conductive layers 311a and 313 contain a material transmitting visible light. In addition, an alignment film 173a is provided between the liquid crystal 312 and the conductive layer 311a, and the alignment film 173b is provided between the liquid crystal 312 and the conductive layer 313. A polarizing plate 170 is provided on an outer surface of the substrate 361.

In the liquid crystal element 340, the conductive layer 311b has a function of reflecting visible light, and the conductive layer 313 has a function of transmitting visible light. Light entering from the substrate 361 side is polarized by the polarizing plate 170, passes through the conductive layer 313 and the liquid crystal 312, and is reflected by the conductive layer 311b. Then, the light passes through the liquid crystal 312 and the conductive layer 313 again and reaches the polarizing plate 170. In this case, alignment of the liquid crystal is controlled with a voltage that is applied between the conductive layer 311b and the conductive layer 313, and thus optical modulation of light can be controlled. That is, the intensity of light emitted through the polarizing plate 170 can be controlled. Light other than one in a particular wavelength region of the light is absorbed by the coloring layer 171, and thus, emitted light is red light, for example.

The light-emitting element 360 is a bottom-emission light-emitting element. The light-emitting element 360 has a structure in which a conductive layer 191, an EL layer 192, and a conductive layer 193b are stacked in this order from the insulating layer 220 side. In addition, a conductive layer 193a is provided to cover the conductive layer 193b. The conductive layer 193b contains a material reflecting visible light, and the conductive layers 191 and 193a contain a material transmitting visible light. Light is emitted from the light-emitting element 360 to the substrate 361 side through the coloring layer 174, the insulating layer 220, the opening 251, the conductive layer 313, and the like.

Here, as illustrated in FIG. 10, the conductive layer 311a transmitting visible light is preferably provided in the opening 251. Accordingly, the liquid crystal 312 is aligned in a region overlapping with the opening 251 as well as in the other regions, in which case an alignment defect of the liquid crystal is prevented from being generated in the boundary portion of these regions and undesired light leakage can be suppressed.

As the polarizing plate 170 provided on an outer surface of the substrate 361, a linear polarizing plate or a circularly polarizing plate can be used. An example of a circularly polarizing plate is a stack including a linear polarizing plate and a quarter-wave retardation plate. Such a structure can reduce reflection of external light. A light diffusion plate may be provided to reduce reflection of external light. The cell gap, alignment, drive voltage, and the like of the liquid crystal element used as the liquid crystal element 340 are controlled in accordance with the kind of the polarizing plate so that desirable contrast is obtained.

An insulating layer 217 is provided on the insulating layer 216 covering an end portion of the conductive layer 191. The insulating layer 217 has a function of a spacer for preventing the insulating layer 220 and the substrate 351 from being closer to each other than necessary. In addition, in the case where the EL layer 192 or the conductive layer 193a is formed using a blocking mask (metal mask), the insulating layer 217 may have a function of preventing the blocking mask from being in contact with a surface on which the EL layer 192 or the conductive layer 193a is formed. Note that the insulating layer 217 is not necessarily provided.

One of a source and a drain of the transistor 205 is electrically connected to the conductive layer 191 of the light-emitting element 360 through the conductive layer 224.

One of a source and a drain of the transistor 206 is electrically connected to the conductive layer 311b through a connection portion 207. The conductive layers 311b and 311a are in contact with and electrically connected to each other. Here, in the connection portion 207, the conductive layers provided on the top and bottom surfaces of the insulating layer 220 are connected to each other through an opening in the insulating layer 220.

A connection portion 204 is provided in a region where the substrate 351 and the substrate 361 do not overlap with each other. The connection portion 204 is electrically connected to the FPC 372 via a connection layer 242. The connection portion 204 has a structure similar to that of the connection portion 207. On the bottom surface of the connection portion 204, a conductive layer obtained by processing the same conductive film as the conductive layer 311a is exposed. Thus, the connection portion 204 and the FPC 372 can be electrically connected to each other through the connection layer 242.

A connection portion 252 is provided in part of a region where the adhesive layer 181 is provided. In the connection portion 252, the conductive layer obtained by processing the same conductive film as the conductive layer 311a is electrically connected to part of the conductive layer 313 with a connector 243. Accordingly, a signal or a potential input from the FPC 372 connected to the substrate 351 side can be supplied to the conductive layer 313 formed on the substrate 361 side through the connection portion 252.

As the connector 243, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. As the connector 243, a material capable of elastic deformation or plastic deformation is preferably used. As illustrated in FIG. 10, the connector 243 that is the conductive particle has a shape that is vertically crushed in some cases. With the crushed shape, the contact area between the connector 243 and a conductive layer electrically connected to the connector 243 can be increased, thereby reducing contact resistance and suppressing the generation of problems such as disconnection.

The connector 243 is preferably provided so as to be covered with the adhesive layer 181. For example, the connector 243 is dispersed in the adhesive layer 181 before curing of the adhesive layer 181.

FIG. 10 illustrates an example of the circuit 364 in which the transistor 201 is provided.

The structure in which the semiconductor layer 231 where a channel is formed is provided between two gates is used as an example of the transistors 201 and 205 in FIG. 10. One gate is formed by the conductive layer 221 and the other gate is formed by a conductive layer 223 overlapping with the semiconductor layer 231 with the insulating layer 212 provided therebetween. Such a structure enables control of threshold voltages of transistors. In that case, the two gates may be connected to each other and supplied with the same signal to operate the transistors. Such transistors can have higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display panel in which the number of wirings is increased because of increase in size or definition.

Note that the transistor included in the circuit 364 and the transistor included in the display portion 362 may have the same structure. A plurality of transistors included in the circuit 364 may have the same structure or different structures. A plurality of transistors included in the display portion 362 may have the same structure or different structures.

A material through which impurities such as water or hydrogen do not easily diffuse is preferably used for at least one of the insulating layers 212 and 213, which cover the transistors. That is, the insulating layer 212 or the insulating layer 213 can function as a barrier film. Such a structure can effectively suppress diffusion of the impurities into the transistors from the outside, and a highly reliable display panel can be provided.

The insulating layer 161 is provided on the substrate 361 side to cover the coloring layer 171 and the light-blocking layer 172. The insulating layer 161 may have a function of a planarization layer. Owing to the insulating layer 161, the surface of the conductive layer 313 can be substantially flat; thus, the alignment state of the liquid crystal 312 can be uniform.

[Cross-Sectional Structure Example 2]

Figure 11:
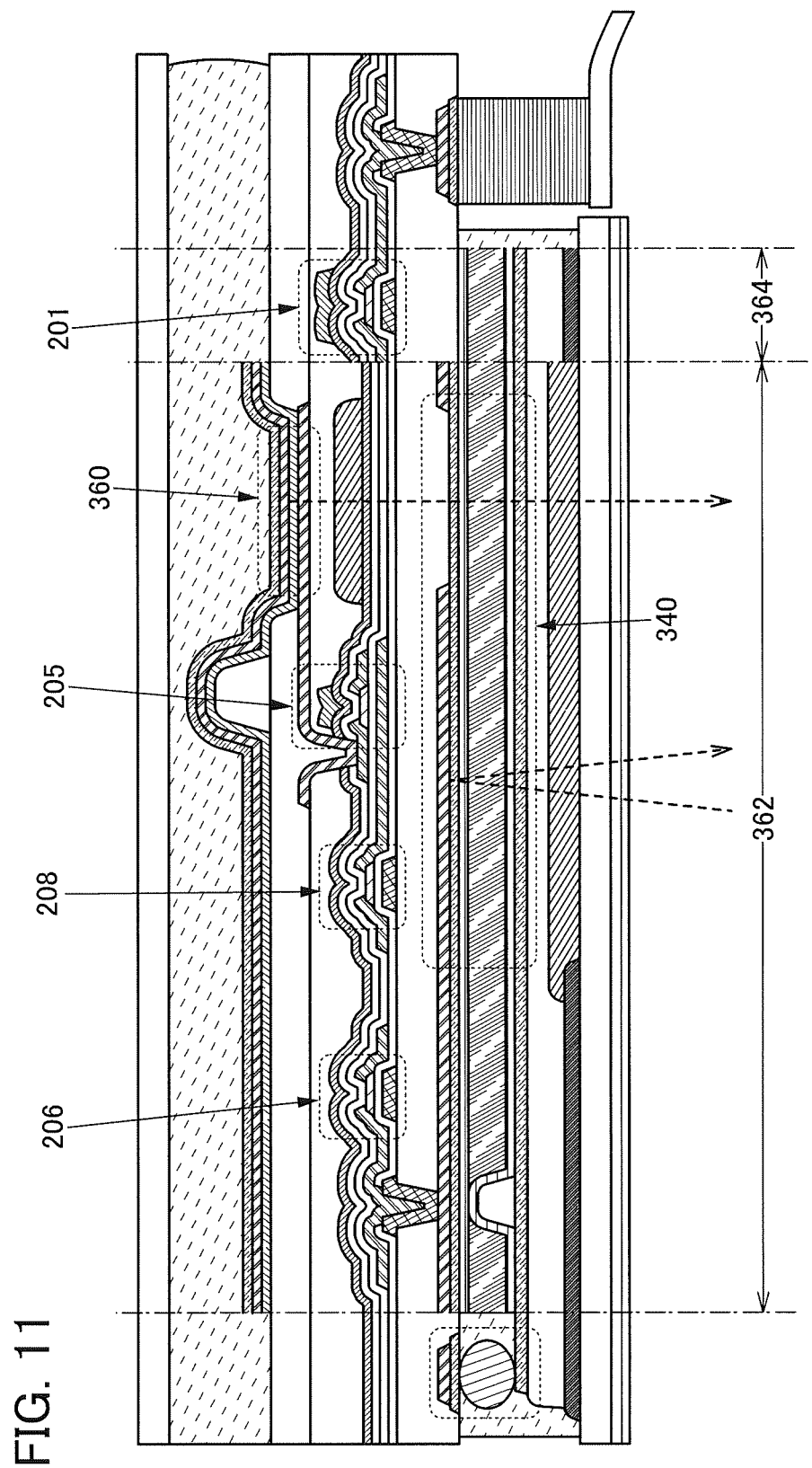
FIG. 11 illustrates a structure of a display device.

The display panel of one embodiment of the present invention may include a region where a first transistor and a second transistor, which are provided in a pixel, overlap with each other as illustrated in FIG. 11. Such a structure enables a fabrication of a display panel having a reduced area per pixel and a high pixel density, which can display a high definition image.

For example, the display panel can include a region where the transistor 205, which is a transistor for driving the light-emitting element 360, and a transistor 208 overlap with each other. Alternatively, the display panel can include a region where the transistor 206, which is a transistor for driving the liquid crystal element 340, and one of the transistors 205 and 208 overlap with each other.

[Cross-Sectional Structure Example 3]

Figure 12:
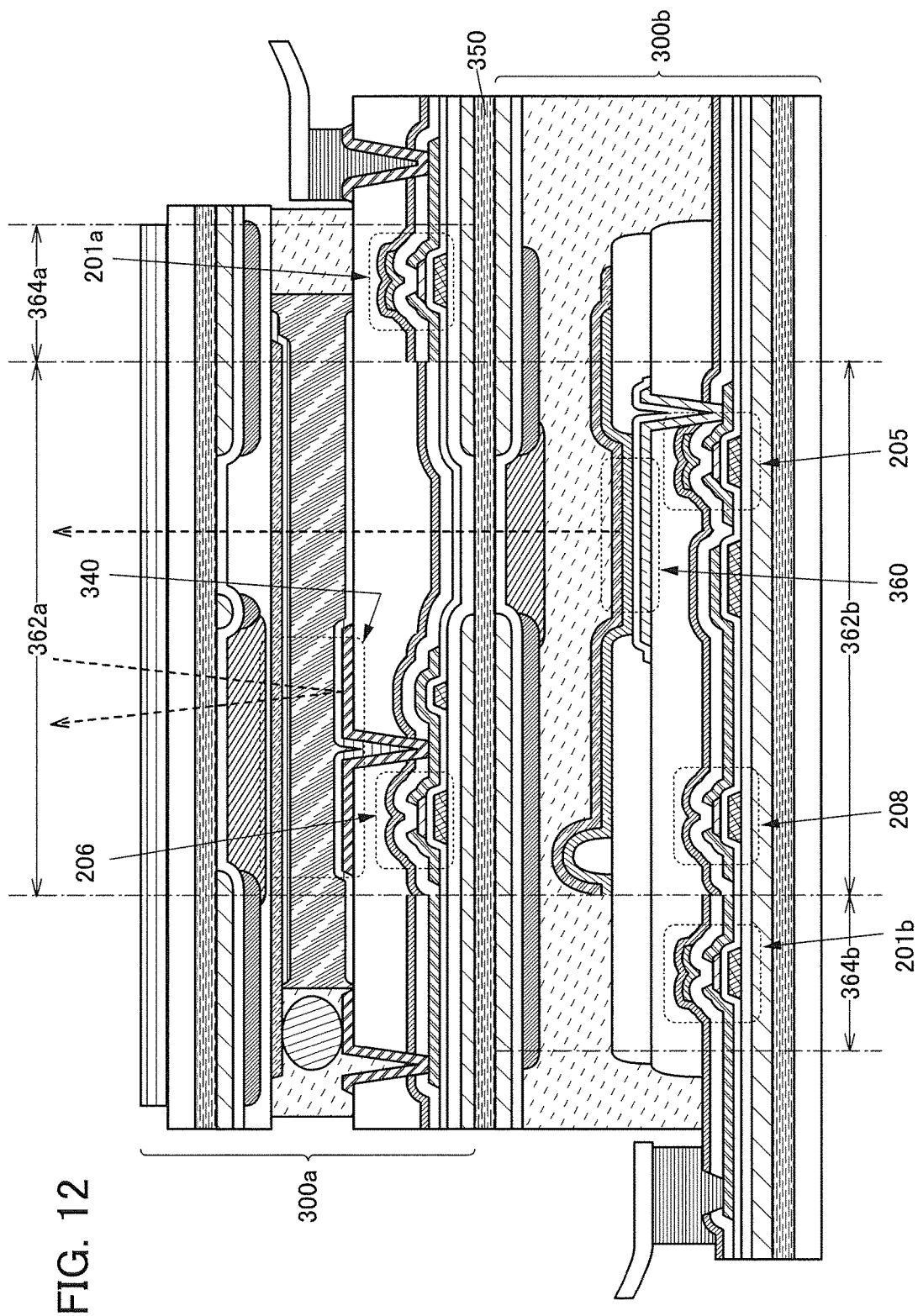
FIG. 12 illustrates a structure of a display device.

In the display panel of one embodiment of the present invention, a display panel 300a and a display panel 300b may be bonded to each other through an adhesive layer 350 as illustrated in FIG. 12. The display panel 300a includes the liquid crystal element 340 and the transistor 206 in a display portion 362a, and a transistor 201a in a circuit 364a for driving the display portion 362a. The display panel 300b includes the light-emitting element 360 and the transistors 205 and 208 in a display portion 362b, and a transistor 201b in a circuit 364b for driving the display portion 362b.

With such a structure, suitable manufacturing steps can be used for each of the display panels 300a and 300b, which leads to improvement in manufacturing yield.

[Components]

The components mentioned above will be specifically described below.

[Substrate]

A material having a flat surface can be used as the substrate included in the display panel. The substrate on the side from which light from the display element is extracted is formed using a material transmitting the light. For example, a material such as glass, quartz, ceramic, sapphire, or an organic resin can be used.

The weight and thickness of the display panel can be decreased by using a thin substrate. A flexible display panel can be obtained by using a substrate that is thin enough to have flexibility.

Since the substrate through which light emission is not extracted does not need to have a light-transmitting property, a metal substrate or the like can be used in addition to the above-mentioned substrates. A metal substrate, which has high thermal conductivity, is preferable because it can easily conduct heat to the whole substrate and accordingly can prevent a local temperature rise in the display panel. To obtain flexibility and bendability, the thickness of a metal substrate is preferably greater than or equal to 10 μm and less than or equal to 200 μm, further preferably greater than or equal to 20 μm and less than or equal to 50 μm.

There is no particular limitation on a material of a metal substrate. A metal such as aluminum, copper, or nickel, an aluminum alloy, or an alloy such as stainless steel can be suitably used, for example.

A substrate subjected to insulation treatment, e.g., a metal substrate whose surface is oxidized or provided with an insulating film may be used. The insulating film may be formed by, for example, a coating method such as a spin-coating method or a dipping method, an electrodeposition method, an evaporation method, or a sputtering method. An oxide film may be formed on the substrate surface by exposure to or heating in an oxygen atmosphere or by an anodic oxidation method or the like.

Examples of the material that has flexibility and transmits visible light include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). It is particularly preferable to use a material with a low thermal expansion coefficient, for example, a material with a thermal expansion coefficient lower than or equal to $30 \times 10^{-6}$/K, such as a polyamide imide resin, a polyimide resin, or PET. A substrate in which a glass fiber is impregnated with an organic resin or a substrate whose thermal expansion coefficient is reduced by mixing an inorganic filler with an organic resin can also be used. A substrate using such a material is lightweight, and thus a display panel using this substrate can also be lightweight.

In the case where a fibrous body is included in the above material, a high-strength fiber of an organic compound or an inorganic compound is used as the fibrous body. The high-strength fiber is specifically a fiber with a high tensile elastic modulus or a fiber with a high Young's modulus. Typical examples thereof include a polyvinyl alcohol-based fiber, a polyester-based fiber, a polyamide-based fiber, a polyethylene-based fiber, an aramid-based fiber, a polyparaphenylene benzobisoxazole fiber, a glass fiber, and a carbon fiber. As the glass fiber, a glass fiber using E glass, S glass, D glass, Q glass, or the like can be used. These fibers may be used in a state of a woven or nonwoven fabric, and a structure body in which this fibrous body is impregnated with a resin and the resin is cured may be used as the flexible substrate. The structure body including the fibrous body and the resin is preferably used as the flexible substrate, in which case the reliability against breaking due to bending or local pressure can be increased.

Alternatively, glass, metal, or the like that is thin enough to have flexibility can be used as the substrate. Alternatively, a composite material in which glass and a resin material are attached to each other with an adhesive layer may be used.

A hard coat layer (e.g., a silicon nitride layer and an aluminum oxide layer) by which a surface of a display panel is protected from damage, a layer (e.g., an aramid resin layer) that can disperse pressure, or the like may be stacked over the flexible substrate. Furthermore, to suppress a decrease in lifetime of the display element due to moisture and the like, an insulating film with low water permeability may be stacked over the flexible substrate. For example, an inorganic insulating material such as silicon nitride, silicon oxynitride, silicon nitride oxide, aluminum oxide, or aluminum nitride can be used.

The substrate may be formed by stacking a plurality of layers. When a glass layer is used, a barrier property against water and oxygen can be improved and thus a highly reliable display panel can be provided.

[Transistor]

The transistor includes a conductive layer serving as a gate electrode, a semiconductor layer, a conductive layer serving as a source electrode, a conductive layer serving as a drain electrode, and an insulating layer serving as a gate insulating layer. In the above, a bottom-gate transistor is used.

Note that there is no particular limitation on the structure of the transistor included in the display device of one embodiment of the present invention. For example, a planar transistor, a staggered transistor, or an inverted staggered transistor may be used. A top-gate transistor or a bottom-gate transistor may be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material used for the transistors, a metal oxide whose energy gap is greater than or equal to 2 eV, preferably greater than or equal to 2.5 eV, further preferably greater than or equal to 3 eV can be used. A typical example thereof is an oxide semiconductor containing indium, and for example, a CAC-OS described later or the like can be used.

A transistor with an oxide semiconductor having a larger band gap and a lower carrier density than silicon has a low off-state current, and thus, charges stored in a capacitor that is series-connected to the transistor can be held for a long time.

The semiconductor layer can be, for example, a film represented by an In-M-Zn-based oxide that contains at least indium, zinc, and M (a metal such as aluminum, titanium, gallium, germanium, yttrium, zirconium, lanthanum, cerium, tin, neodymium, or hafnium).

In the case where the oxide semiconductor contained in the semiconductor layer contains an In-M-Zn-based oxide, it is preferable that the atomic ratio of metal elements of a sputtering target used for forming a film of the In-M-Zn oxide satisfy In≥M and Zn≥M. The atomic ratio of metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio of metal elements in the formed oxide semiconductor layer varies from the above atomic ratios of metal elements of the sputtering targets in a range of ±40%.

The bottom-gate transistor described in this embodiment is preferable because the number of manufacturing steps can be reduced. When an oxide semiconductor, which can be formed at a lower temperature than polycrystalline silicon, is used, materials with low heat resistance can be used for a wiring, an electrode, or a substrate below the semiconductor layer, so that the range of choices of materials can be widened. For example, an extremely large glass substrate can be suitably used.

An oxide semiconductor film with low carrier density is used as the semiconductor layer. For example, the semiconductor layer may be an oxide semiconductor film whose carrier density is lower than or equal to $1 \times 10^{17}/cm^3$, preferably lower than or equal to $1 \times 10^{15}/cm^3$, further preferably lower than or equal to $1 \times 10^{13}/cm^3$, still further preferably lower than or equal to $1 \times 10^{11}/cm^3$, even further preferably lower than $1 \times 10^{10}/cm^3$, and higher than or equal to $1 \times 10^{-9}/cm^3$. Such an oxide semiconductor is referred to as a highly purified intrinsic or substantially highly purified intrinsic oxide semiconductor. The oxide semiconductor has a low impurity concentration and a low density of defect states, and thus can be said to have stable characteristics.

Note that, without limitation to those described above, a material with an appropriate composition may be used in accordance with required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the oxide semiconductor contained in the semiconductor layer, oxygen vacancies are increased in the semiconductor layer, and the semiconductor layer becomes n-type. Thus, the concentration of silicon or carbon (measured by secondary ion mass spectrometry) in the semiconductor layer is set to lower than or equal to $2 \times 10^{18}$ atoms/cm$^3$, preferably lower than or equal to $2 \times 10^{17}$ atoms/cm$^3$.

Alkali metal and alkaline earth metal might generate carriers when bonded to an oxide semiconductor, in which case the off-state current of the transistor might be increased. Therefore, the concentration of alkali metal or alkaline earth metal in the semiconductor layer, which is measured by secondary ion mass spectrometry, is set to lower than or equal to $1 \times 10^{18}$ atoms/cm$^3$, preferably lower than or equal to $2 \times 10^{16}$ atoms/cm$^3$.

When nitrogen is contained in the oxide semiconductor contained in the semiconductor layer, electrons serving as carriers are generated and the carrier density increases, so that the semiconductor layer easily becomes n-type. Thus, a transistor including an oxide semiconductor that contains nitrogen is likely to be normally on. Hence, the concentration of nitrogen in the semiconductor layer, which is measured by secondary ion mass spectrometry, is preferably set to lower than or equal to $5 \times 10^{18}$ atoms/cm$^3$.

The semiconductor layer may have a non-single-crystal structure, for example. The non-single-crystal structure includes CAAC-OS (c-axis aligned crystalline oxide semiconductor, or c-axis aligned a-b-plane-anchored crystalline oxide semiconductor) including a c-axis aligned crystal, a polycrystalline structure, a microcrystalline structure, or an amorphous structure, for example. Among the non-single-crystal structures, an amorphous structure has the highest density of defect states, whereas CAAC-OS has the lowest density of defect states.

An oxide semiconductor film having an amorphous structure has disordered atomic arrangement and no crystalline component, for example. In another example, an oxide film having an amorphous structure has an absolutely amorphous structure and no crystal part.

Note that the semiconductor layer may be a mixed film including two or more of the following: a region having an amorphous structure, a region having a microcrystalline structure, a region having a polycrystalline structure, a region of CAAC-OS, and a region having a single-crystal structure. The mixed film has, for example, a single-layer structure or a stacked-layer structure including two or more of the above-described regions in some cases.

<Composition of CAC-OS>

Described below is the composition of a cloud-aligned composite oxide semiconductor (CAC-OS) which can be used for a transistor disclosed in one embodiment of the present invention.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region is described as having higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

The CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Thus, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part of the CAC-OS, and these nanoparticle regions are randomly dispersed to form a mosaic pattern in the CAC-OS.

The CAC-OS can be formed by a sputtering method under a condition where a substrate is not heated, for example. In the case where the CAC-OS is formed by a sputtering method, one or more of an inert gas (typically, argon), an oxygen gas, and a nitrogen gas may be used as a deposition gas. The flow rate of the oxygen gas to the total flow rate of the deposition gas in deposition is preferably as low as possible, for example, the flow rate of the oxygen gas is higher than or equal to 0% and lower than 30%, preferably higher than or equal to 0% and lower than or equal to 10%.

The CAC-OS is characterized in that a clear peak is not observed when measurement is conducted using a θ/2θ scan by an out-of-plane method with an X-ray diffraction (XRD). That is, it is found by the XRD that there are no alignment in the a-b plane direction and no alignment in the c-axis direction in the measured areas.

In the CAC-OS, an electron diffraction pattern that is obtained by irradiation with an electron beam with a probe diameter of 1 nm (also referred to as nanobeam electron beam) has regions with high luminance in a ring pattern and a plurality of bright spots appear in the ring-like pattern. Thus, it is found from the electron diffraction pattern that the crystal structure of the CAC-OS includes a nanocrystalline (nc) structure that does not show alignment in the plane direction and the cross-sectional direction.

For example, energy dispersive X-ray spectroscopy (EDX) is used to obtain EDX mapping, and according to the EDX mapping, the CAC-OS of the In—Ga—Zn oxide has a composition in which the regions including $GaO_{X3}$ as a main component and the regions including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is generated. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used in a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor element including a CAC-OS has high reliability. Thus, the CAC-OS is suitably used in a variety of semiconductor devices typified by a display.

Alternatively, silicon may be used as a semiconductor in which a channel of a transistor is formed. Although amorphous silicon may be used as silicon, silicon having crystallinity is particularly preferable. For example, microcrystalline silicon, polycrystalline silicon, single crystal silicon, or the like is preferably used. In particular, polycrystalline silicon can be formed at a lower temperature than single crystal silicon and has higher field effect mobility and higher reliability than amorphous silicon.

The bottom-gate transistor described in this embodiment is preferable because the number of manufacturing steps can be reduced. When amorphous silicon, which can be formed at a lower temperature than polycrystalline silicon, is used for the semiconductor layer, materials with low heat resistance can be used for a wiring, an electrode, or a substrate below the semiconductor layer, resulting in wider choice of materials. For example, an extremely large glass substrate can be suitably used. Meanwhile, the top-gate transistor is preferable because an impurity region is easily formed in a self-aligned manner and variation in characteristics can be reduced. The top-gate transistor is particularly preferable when polycrystalline silicon, single-crystal silicon, or the like is employed.

[Conductive Layer]

As materials for conductive layers such as wirings and electrodes included in a display device, a gate, a source, and a drain of a transistor; any of metals such as aluminum, titanium, chromium, nickel, copper, yttrium, zirconium, molybdenum, silver, tantalum, and tungsten, or an alloy containing any of these metals as its main component can be used. A single-layer structure or multi-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because the controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case where the metal material or the alloy material (or the nitride thereof) is used, the thickness is set small enough to be able to transmit light. Alternatively, a stack of any of the above materials can be used as the conductive layer. For example, a stacked film of indium tin oxide and an alloy of silver and magnesium is preferably used because the conductivity can be increased. They can be used for conductive layers such as a variety of wirings and electrodes included in a display device, and conductive layers (e.g., conductive layers serving as a pixel electrode or a common electrode) included in a display element.

[Insulating Layer]

Examples of an insulating material that can be used for the insulating layers include a resin such as acrylic or epoxy resin, a resin having a siloxane bond such as silicone, and an inorganic insulating material such as silicon oxide, silicon oxynitride, silicon nitride oxide, silicon nitride, or aluminum oxide.

The light-emitting element is preferably provided between a pair of insulating films with low water permeability, in which case impurities such as water can be prevented from entering the light-emitting element, thereby preventing a decrease in the reliability of the device.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. A silicon oxide film, a silicon oxynitride film, an aluminum oxide film, or the like may also be used.

For example, the water vapor transmittance of the insulating film with low water permeability is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], and still further preferably lower than or equal to $1\times10^{-8}$ [g/(m$^2$·day)].

[Liquid Crystal Element]

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes; for example, other than the VA mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, or an antiferroelectric liquid crystal (AFLC) mode can be used.

The liquid crystal element controls the transmission or non-transmission of light by utilizing an optical modulation action of a liquid crystal. Note that the optical modulation action of the liquid crystal is controlled by an electric field applied to the liquid crystal (including a horizontal electric field, a vertical electric field, or an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like in accordance with conditions.

As the liquid crystal material, either a positive liquid crystal or a negative liquid crystal may be used, and an appropriate liquid crystal material can be used in accordance with the mode or design to be used.

An alignment film can be provided to adjust the alignment of a liquid crystal. In the case where a horizontal electric field mode is employed, a liquid crystal exhibiting a blue phase for which an alignment film is unnecessary may be used. The blue phase is a liquid crystal phase, which is generated just before a cholesteric phase changes into an isotropic phase when the temperature of a cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition containing a liquid crystal exhibiting a blue phase and a chiral material has a short response time and optical isotropy, which eliminates the need for an alignment process and reduces the viewing angle dependence. Since the alignment film does not need to be provided, rubbing treatment is not necessary; accordingly, electrostatic discharge damage caused by the rubbing treatment can be prevented, reducing defects and damage of a liquid crystal display device in the manufacturing process.

The liquid crystal element may be a transmissive liquid crystal element, a reflective liquid crystal element, a semi-transmissive liquid crystal element, or the like.

In one embodiment of the present invention, in particular, a reflective liquid crystal element can be used.

In the case where a transmissive or semi-transmissive liquid crystal element is used, two polarizing plates are provided such that a pair of substrates are sandwiched therebetween. Furthermore, a backlight is provided outside the polarizing plates. The backlight may be a direct-below backlight or an edge-light backlight. The direct-below backlight including a light-emitting diode (LED) is preferably used because local dimming is easily performed to improve contrast. The edge-light type backlight is preferably used because the thickness of a module including the backlight can be reduced.

In the case where a reflective liquid crystal element is used, a polarizing plate is provided on the display surface side. In addition, a light diffusion plate is preferably provided on the display surface side to improve visibility.

In the case where a reflective or a semi-transmissive liquid crystal element is used, a front light may be provided outside the polarizing plate. As the front light, an edge-light front light is preferably used. A front light including a light-emitting diode (LED) is preferably used to reduce power consumption.

[Light-Emitting Element]

As the light-emitting element, a self-luminous element can be used, and an element whose luminance is controlled by current or voltage is included in the category of the light-emitting element. For example, an LED, an organic EL element, an inorganic EL element, or the like can be used.

The light-emitting element has a top emission structure, a bottom emission structure, a dual emission structure, or the like. A conductive film that transmits visible light is used as the electrode through which light is extracted. A conductive film that reflects visible light is preferably used as the electrode through which light is not extracted.

The EL layer includes at least a light-emitting layer. In addition to the light-emitting layer, the EL layer may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer, either a low-molecular compound or a high-molecular compound can be used, and an inorganic compound may also be used. Each of the layers included in the EL layer can be formed by any of the following methods: an evaporation method (including a vacuum evaporation method), a transfer method, a printing method, an inkjet method, a coating method, and the like.

When a voltage higher than the threshold voltage of the light-emitting element is applied between a cathode and an anode, holes are injected to the EL layer from the anode side and electrons are injected to the EL layer from the cathode side. The injected electrons and holes are recombined in the EL layer and a light-emitting substance contained in the EL layer emits light.

In the case where a light-emitting element emitting white light is used as the light-emitting element, the EL layer preferably contains two or more kinds of light-emitting substances. For example, the two or more kinds of light-emitting substances are selected so as to emit light of complementary colors to obtain white light emission. Specifically, it is preferable to contain two or more selected from light-emitting substances emitting light of red (R), green (G), blue (B), yellow (Y), orange (O), and the like and light-emitting substances emitting light containing two or more of spectral components of R, G, and B. The light-emitting element preferably emits light with a spectrum having two or more peaks in the wavelength range of a visible light region (e.g., 350 nm to 750 nm). An emission spectrum of a material emitting light having a peak in a yellow wavelength range preferably includes spectral components also in green and red wavelength ranges.

A light-emitting layer containing a light-emitting material emitting light of one color and a light-emitting layer containing a light-emitting material emitting light of another color are preferably stacked in the EL layer. For example, the plurality of light-emitting layers in the EL layer may be stacked in contact with each other or may be stacked with a region not including any light-emitting material therebetween. For example, between a fluorescent layer and a phosphorescent layer, a region containing the same material as one in the fluorescent layer or the phosphorescent layer (e.g., a host material or an assist material) and no light-emitting material may be provided. This facilitates the manufacture of the light-emitting element and reduces the drive voltage.

The light-emitting element may be a single element including one EL layer or a tandem element in which a plurality of EL layers are stacked with a charge generation layer therebetween.

The conductive film that transmits visible light can be formed using, for example, indium oxide, indium tin oxide, indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stacked film of any of the above materials can be used for the conductive layers. For example, a stacked film of indium tin oxide and an alloy of silver and magnesium is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Furthermore, lanthanum, neodymium, germanium, or the like may be added to the metal material or the alloy. Alternatively, an alloy containing aluminum (an aluminum alloy) such as an alloy of aluminum and titanium, an alloy of aluminum and nickel, or an alloy of aluminum and neodymium may be used. Alternatively, an alloy containing silver such as an alloy of silver and copper, an alloy of silver and palladium, or an alloy of silver and magnesium may be used. An alloy containing silver and copper is preferable because of its high heat resistance. Furthermore, when a metal film or a metal oxide film is stacked in contact with an aluminum film or an aluminum alloy film, oxidation can be suppressed.

Examples of a material for the metal film or the metal oxide film include titanium and titanium oxide. Alternatively, the above conductive film that transmits visible light and a film containing a metal material may be stacked. For example, a stack of silver and indium tin oxide, a stack of an alloy of silver and magnesium and indium tin oxide, or the like can be used.

Each of the electrodes can be formed by an evaporation method or a sputtering method. Alternatively, a discharging method such as an inkjet method, a printing method such as a screen printing method, or a plating method may be used.

Note that the aforementioned light-emitting layer and layers containing a substance with a high hole-injection property, a substance with a high hole-transport property, a substance with a high electron-transport property, a substance with a high electron-injection property, and a substance with a bipolar property may include an inorganic compound such as a quantum dot or a high molecular compound (e.g., an oligomer, a dendrimer, or a polymer). For example, used for the light-emitting layer, the quantum dot can serve as a light-emitting material.

The quantum dot may be a colloidal quantum dot, an alloyed quantum dot, a core-shell quantum dot, a core quantum dot, or the like. The quantum dot containing elements belonging to Groups 12 and 16, elements belonging to Groups 13 and 15, or elements belonging to Groups 14 and 16, may be used. Alternatively, the quantum dot containing an element such as cadmium, selenium, zinc, sulfur, phosphorus, indium, tellurium, lead, gallium, arsenic, or aluminum may be used.

[Adhesive Layer]

As the adhesive layer, a variety of curable adhesives such as a reactive curable adhesive, a thermosetting adhesive, an anaerobic adhesive, and a photocuring adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Further alternatively, an adhesive sheet or the like may be used.

The resin may include a drying agent. For example, a substance that adsorbs moisture by chemical adsorption, such as oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent impurities such as moisture from entering the element, thereby improving the reliability of the display panel.

In addition, it is preferable to mix a filler with a high refractive index or light-scattering member into the resin, in which case light extraction efficiency can be enhanced. For example, titanium oxide, barium oxide, zeolite, zirconium, or the like can be used.

[Connection Layer]

As the connection layer, an anisotropic conductive film (ACF), an anisotropic conductive paste (ACP), or the like can be used.

[Coloring Layer]

Examples of a material that can be used for the coloring layers include a metal material, a resin material, and a resin material containing a pigment or dye.

[Light-Blocking Layer]

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked-layer structure of a film containing a material of a coloring layer that transmits light of a certain color and a film containing a material of a coloring layer that transmits light of another color can be employed. It is preferable that the coloring layer and the light-blocking layer be formed using the same material because the same manufacturing apparatus can be used and the process can be simplified.

At least part of this embodiment can be implemented in combination with any of the other embodiments described in this specification as appropriate.

Embodiment 4

Examples of an electronic device for which the display system of one embodiment of the present invention can be used include display apparatuses, personal computers, image storage devices or image reproducing devices provided with recording media, mobile phones, game machines (including portable game consoles), portable data terminals, e-book readers, cameras such as video cameras and digital still cameras, goggle-type displays (head mounted displays), navigation systems, audio reproducing devices (e.g., car audio players and digital audio players), copiers, facsimiles, printers, multifunction printers, automated teller machines (ATM), and vending machines. FIGS. 13A to 13F illustrate specific examples of the electronic devices.

Figure 13A:
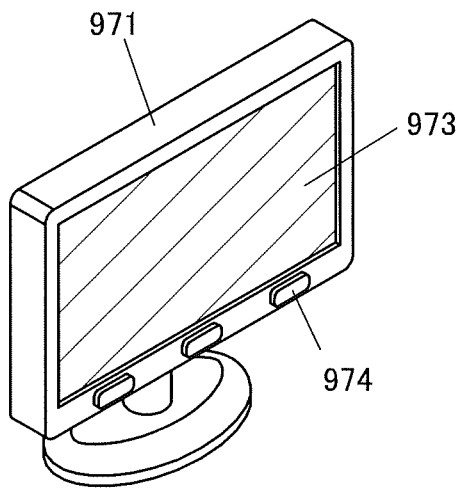
FIGS. 13A to 13F each illustrate an electronic device.

FIG. 13A illustrates a navigation system, which includes a housing 971, a display portion 973, an operation key 974, and the like. A touch sensor is provided in the display portion 973, so that principal input operation can be performed. When the display system of one embodiment of the present invention is used in the navigation system illustrated in FIG. 13A, power consumption of the navigation system can be reduced, and a virtual object can be stably displayed.

Figure 13B:
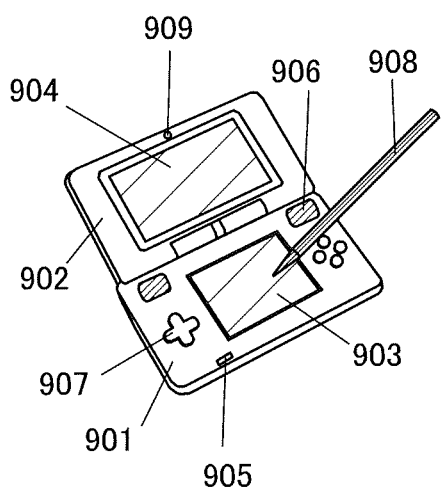

FIG. 13B illustrates a portable game console, which includes a housing 901, a housing 902, a display portion 903, a display portion 904, a microphone 905, a speaker 906, an operation key 907, a stylus 908, a camera 909, and the like. Although the portable game console in FIG. 13B has two display portions (i.e., the display portions 903 and 904), the number of display portions included in a portable game console is not limited to this. When the display system of one embodiment of the present invention is used in the portable game console illustrated in FIG. 13B, power consumption of the portable game console can be reduced, and a virtual object can be stably displayed.

Figure 13C:
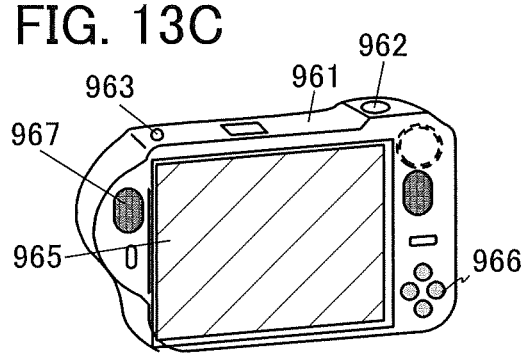

FIG. 13C illustrates a digital camera, which includes a housing 961, a shutter button 962, a microphone 963, a speaker 967, a display portion 965, an operation key 966, and the like. When the display system of one embodiment of the present invention is used in the digital camera illustrated in FIG. 13C, power consumption of the digital camera can be reduced, and a virtual object can be stably displayed.

Figure 13D:
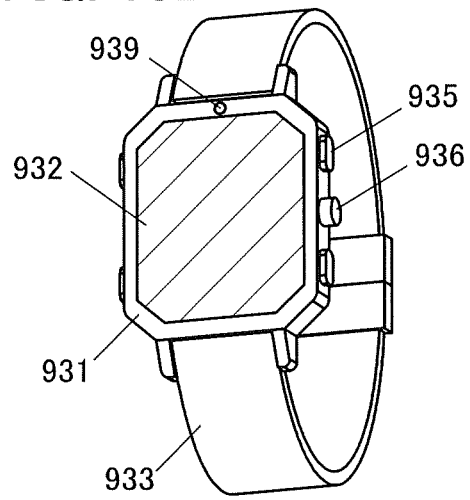

FIG. 13D illustrates a watch-type information terminal, which includes a housing 931, a display portion 932, a wristband 933, an operation button 935, a winder 936, a camera 939, and the like. The display portion 932 may be a touch panel. When the watch-type information terminal illustrated in FIG. 13D is provided with the display system of one embodiment of the present invention, its power consumption can be reduced, and a virtual object can be stably displayed.

Figure 13E:
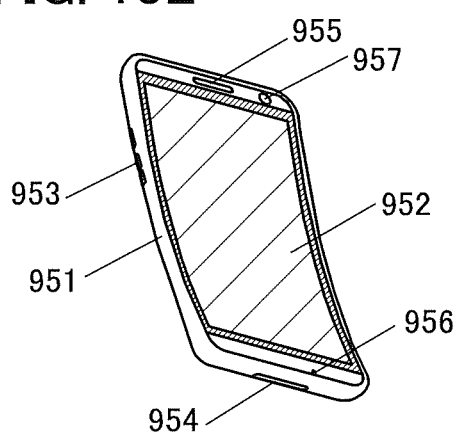

FIG. 13E illustrates an example of a mobile phone, which includes a housing 951, a display portion 952, an operation button 953, an external connection port 954, a speaker 955, a microphone 956, a camera 957, and the like. The display portion 952 of the mobile phone includes a touch sensor. All operations including making a call and inputting text can be performed by touch on the display portion 952 with a finger, a stylus, or the like. When the display system of one embodiment of the present invention is used in the mobile phone illustrated in FIG. 13E, power consumption of the mobile phone can be reduced, and a virtual object can be stably displayed.

Figure 13F:
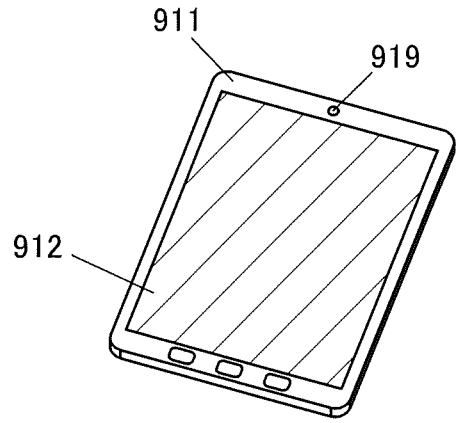

FIG. 13F illustrates a portable data terminal, which includes a housing 911, a display portion 912, a camera 919, and the like. The touch panel function of the display portion 912 enables input and output of information. When the display system of one embodiment of the present invention is used in the portable data terminal illustrated in FIG. 13F, power consumption of the portable data terminal can be reduced, and a virtual object can be stably displayed.

At least part of this embodiment can be implemented in combination with any of the other embodiments described in this specification, thereby enabling stable display of a virtual object.

This application is based on Japanese Patent Application Serial No. 2016-181419 filed with Japan Patent Office on Sep. 16, 2016, the entire contents of which are hereby incorporated by reference.

What is claimed is:

1. A display system comprising:
an imaging device;
a processing device comprising a first counter and a second counter; and
a display device comprising a first display element and a second display element,
wherein the imaging device is configured to supply imaging data based on a captured image to the processing device,
wherein the processing device is configured to determine whether the captured image contains a predetermined object, and perform image processing based on the determination,
wherein the processing device is configured to supply first image data containing the captured image and second image data based on the image processing to the display device,
wherein the processing device is configured to add 1 to a value of the first counter of the processing device in a case where the captured image contains the predetermined object, and configured to generate data of an image of a virtual object in a case where the value of the first counter is greater than or equal to a first predetermined number,
wherein the processing device is configured to add 1 to a value of the second counter of the processing device in a case where the captured image does not contain the predetermined object, and configured not to perform the image processing in a case where the value of the second counter is greater than or equal to a second predetermined number,
wherein the first display element is configured to display an image based on the first image data, and
wherein the second display element is configured to display an image based on the second image data.

2. The display system according to claim 1, wherein the second image data contains data of an image of the virtual object.

3. The display system according to claim 1, wherein the processing device comprises a first memory portion configured to store the first image data, and a second memory portion configured to store the second image data.

4. The display system according to claim 1,
wherein the first display element is configured to reflect visible light, and
wherein the second display element is configured to emit visible light.

5. The display system according to claim 1,
wherein the first display element comprises a liquid crystal element, and
wherein the second display element comprises a light-emitting element.

6. The display system according to claim 1,
wherein the display device further comprises a first transistor electrically connected to the first display element, and a second transistor electrically connected to the second display element, and
wherein a channel region of the first transistor and a channel region of the second transistor each comprises an oxide semiconductor.

7. An electronic device using the display system according to claim 1.

8. A display method comprising the steps of:
supplying imaging data based on a captured image from an imaging device to a processing device;
determining whether the captured image contains a predetermined object, and generating data of an image of a virtual object based on the determination by the processing device;
adding 1 to a value of a first counter in a case where the captured image contains the predetermined object;
adding 1 to a value of a second counter in a case where the captured image does not contain the predetermined object;
displaying the captured image and the image of the virtual object by a display device in a case where the captured image contains the predetermined object and the value of the first counter of the processing device is greater than or equal to a first predetermined number; and
displaying the captured image by the display device in a case where the captured image does not contain the predetermined object and the value of the second counter of the processing device is greater than or equal to a second predetermined number.

9. The display method according to claim 8,
wherein the captured image is displayed by a first display element of the display device, and
wherein the image of the virtual object is displayed by a second display element of the display device.

10. The display method according to claim 9,
wherein the first display element comprises a liquid crystal element, and
wherein the second display element comprises a light-emitting element.

* * * * *